(12) United States Patent
Tsubusaki et al.

(10) Patent No.: US 10,633,489 B2
(45) Date of Patent: *Apr. 28, 2020

(54) HYDROPHILIC POLYMER DERIVATIVE HAVING BENZYLIDENE ACETAL LINKER

(71) Applicant: NOF CORPORATION, Tokyo (JP)

(72) Inventors: Takuma Tsubusaki, Kawasaki (JP); Yuji Yamamoto, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,972

(22) Filed: Jun. 18, 2018

(65) Prior Publication Data

US 2018/0298143 A1    Oct. 18, 2018

Related U.S. Application Data

(62) Division of application No. 14/779,676, filed as application No. PCT/JP2014/058201 on Mar. 25, 2014, now Pat. No. 10,023,693.

(30) Foreign Application Priority Data

Mar. 25, 2013 (JP) ................. 2013-061428

(51) Int. Cl.
| | |
|---|---|
| *C08G 65/48* | (2006.01) |
| *C08G 65/26* | (2006.01) |
| *C08G 65/332* | (2006.01) |
| *C08G 65/333* | (2006.01) |
| *C08G 65/334* | (2006.01) |
| *C08G 65/331* | (2006.01) |

(52) U.S. Cl.
CPC ......... *C08G 65/48* (2013.01); *C08G 65/2609* (2013.01); *C08G 65/331* (2013.01); *C08G 65/332* (2013.01); *C08G 65/333* (2013.01); *C08G 65/3342* (2013.01); *C08G 65/33348* (2013.01)

(58) Field of Classification Search
CPC .................................................. C08G 65/48
See application file for complete search history.

(56) References Cited

U.S. PATENT DOCUMENTS

| | | | |
|---|---|---|---|
| 3,585,242 A | 6/1971 | Roos et al. | |
| 4,632,891 A | 12/1986 | Banks et al. | |
| 5,973,069 A | 10/1999 | Kataoka et al. | |
| 6,090,317 A | 7/2000 | Kataoka et al. | |
| 8,562,965 B2 | 10/2013 | McManus et al. | |
| 10,023,693 B2 * | 7/2018 | Tsubusaki | C08G 65/331 |
| 2008/0299069 A1 | 12/2008 | McManus et al. | |
| 2009/0011993 A1 | 1/2009 | Murthy et al. | |
| 2009/0220615 A1 | 9/2009 | Frechet et al. | |
| 2010/0062968 A1 | 3/2010 | Pulendran et al. | |
| 2012/0294845 A1 | 11/2012 | Chen et al. | |
| 2014/0039167 A1 | 2/2014 | McManus et al. | |

FOREIGN PATENT DOCUMENTS

| | | |
|---|---|---|
| CN | 1187212 A | 7/1998 |
| JP | 61-158974 A | 7/1986 |
| JP | 2008-540558 A | 11/2008 |
| JP | 2012-533660 A | 12/2012 |
| WO | 96/32434 A1 | 10/1996 |
| WO | 2005/108463 A2 | 11/2005 |
| WO | 2006/122223 A2 | 11/2006 |

OTHER PUBLICATIONS

Berkovich-Berger et al. Chem. Commun. 2008, 1686-1688 (Year: 2008).*
Berkovich-Berger et al.; Facile acetal dynamic combinatorial library; Chem. Commun. 2008, 1689-1688.
CAPLUS record of Nomura et al.; The catalytic effects of polyethylene glycols and their ethers on the Reimer-Tiemann reaction; Nippon Kagaku Hisaji; 1989, 6, 977-982.
Nomura et al.; The catalytic effects of polyethylene glycols and their ethers on the Reimer-Tiemann reaction; Nippon Kagaku Hisaji; 1989, 6, 977-982.
Jain, et al. Synthesis and Degradation of pH-Sensitive Linear Poly(amidoamine)s; Marcromolecules 2007, 40, 452-457.
Chatterjee,et al.; A novel photodegradable hyperbranched polymeric photoresis; Chem. Commun. 2013, 49, 11041-11043; (2013).
Hansch et al.; A Survey of Hammett Substituent Constants and Resonance and Field Parameters; Chem. Rev. 1991, 165-195.
Communication dated Nov. 2, 2017, from the Japanese Patent Office in counterpart application No. 2014-061070.
Communication dated Sep. 22, 2016, from the European Patent Office in counterpart European Application No. 14773177.2.

(Continued)

*Primary Examiner* — Matthew P Coughlin
(74) *Attorney, Agent, or Firm* — Sughrue Mion, PLLC

(57) ABSTRACT

A hydrophilic polymer derivative having a benzylidene acetal linker whose hydrolysis rate at the pH of a weakly acidic environment in the living body can be accurately controlled. A hydrophilic polymer derivative having a benzylidene acetal linker, which is represented by the following formula (1):

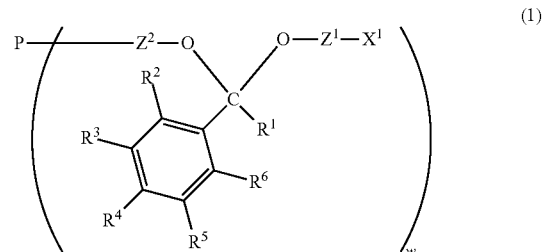

(1)

wherein $R^1$ is a hydrogen atom or a hydrocarbon group; $R^2$, $R^3$, $R^4$, $R^5$, and $R^6$ are each independently a hydrogen atom or a substituent and at least one of $R^3$, $R^4$, and $R^5$ is an electron-withdrawing substituent or at least one of $R^2$ and $R^6$ represents a substituent; $X^1$ is a chemically reactive functional group; P is a hydrophilic polymer; w is an integer of 1 to 8; and $Z^1$ and $Z^2$ are an independently selected divalent spacer.

12 Claims, 2 Drawing Sheets

(56) References Cited

OTHER PUBLICATIONS

Gillies, et al.; "Acetals as pH-Sensitive Linkages for Drug Delivery", Bioconjugate Chemistry, Oct. 2004, vol. 15. No. 6, 10 pages total.
Henrik Ihre et al., "Fast and Convenient Divergent Synthesis of Aliphatic Ester Dendrimers by Anhydride Coupling", J.American Chemical Society, Aliphatic Ester Dendrimer Synthesis, 2001, vol. 123, No. 25, (pp. 5908-5917), XP-002638672.
Hiki, et al.; "Design and Synthesis of Novel PEG Derivatives Integrated with Both PEGylation and DePEGylation Functionality", Preprints of The Society of Polymer Science, 57th Annual Meeting of The Society of Polymer Science, Japan, May 2008, 1 page.
Office Action dated Jun. 8, 2016 by the State Intellectual Property Office of P.R. China in counterpart Chinese Application No. 201480018426.8.
Search Report dated Jul. 1, 2014, issued by the International Searching Authority in counterpart International Application No. PCT/JP2014/058201 (PCT/ISA/210).
Wolf, et al.; "Poly(isoglycerol methacrylate)-b-poly(D or L-lactide) Copolymers: A Novel Hydrophilic Methacrylate as Building Block for Supramolecular Aggregates", Macromolecules, Mar. 2010, vol. 43, No. 7, 11 pages total.
Written Opinion dated Jul. 1, 2014, issued by the International Searching Authority in counterpart International Application No. PCT/JP2014/058201.
Niren Murthy et al., "A macromolecular delivery vehicle for protein-based vaccines: Acid-degradable protein-loaded microgels", PNAS, vol. 100, No. 9, Apr. 29, 2003, (pp. 4995-5000), www.pnas.org/cgS/doS/10.1073/pnas.0930644100.
Communication dated Jul. 12, 2018, issued by the Japanese Patent Office in counterpart Japanese Application No. 2014-061070.

* cited by examiner

HYDROPHILIC POLYMER DERIVATIVE HAVING BENZYLIDENE ACETAL LINKER

CROSS-REFERENCE TO THE RELATED APPLICATION

This application is a Divisional Application of U.S. application Ser. No. 14/779,676, filed on Sep. 24, 2015, which is a National Stage of International Application No. PCT/JP2014/058201 filed Mar. 25, 2014, which claims the benefit of Japanese Patent Application No. 2013-061428, filed on Mar. 25, 2013, the contents of all of which are incorporated herein by reference in their entirety.

TECHNICAL FIELD

The present invention relates to a hydrophilic polymer derivative which has an acetal linker capable of acid hydrolysis and is used for chemical modification of biofunctional molecules such as physiologically active proteins, peptides, antibodies, nucleic acids, and low-molecular drugs and drug carriers such as liposomes and polymer micelles.

BACKGROUND ART

In drug delivery systems, chemical modification of biofunctional molecules or drug carriers with a hydrophilic polymer having low antigenicity is an effective technique for increasing water solubility and bioavailability of these drugs and the like and for prolonging circulation time in blood. On the other hand, it is known that the formation of a hydrated layer by the hydrophilic polymer decreases interaction with cell membranes and inhibits in vivo/intracellular kinetics such as uptake into cells and endosome escape after the drugs and the like bound to the hydrophilic polymer are transported to the tissue or site to be a target. For such problems, an approach to overcome the problems by detaching the hydrophilic polymer chain from the drugs and the like at a suitable timing has been performed. Most of the strategies utilize an environmental change at each portion of the living body, such as reductive environment or the presence or absence of a specific enzyme, as a trigger of the detachment of the hydrophilic polymer chain. One of them is a technique of utilizing a change in pH.

The periphery of a tumor tissue in the living body is known to be an acidic environment as compared to normal tissues and the pH of endosomal interior after the drugs and the like are introduced into cells via an endocytosis pathway also gradually decreases. Accordingly, for the purpose of selectively detaching the hydrophilic polymer under the acidic environment, there have been reported a large number of synthetic examples of hydrophilic polymer derivatives having an acid hydrolyzable acetal linker introduced into the structure. However, there are no examples in which the hydrolyzability of the acetal linker can be controlled and not a few examples involve a problem in the method of introducing the acetal linker.

For example, Patent Document 1 discloses a branched polyethylene glycol derivative, in which two chains of polyethylene glycol that is a hydrophilic polymer having low antigenicity are bound via an acetal group that is derived from various aldehydes or ketones, and a synthetic method thereof but does not describe any evaluation data of hydrolyzability. Also, the synthetic method described therein is a method for obtaining a polyethylene glycol derivative having an acetal linker by reacting an excess amount of polyethylene glycol for various aldehydes or ketones and hence much unreacted polyethylene glycol remains after the reaction. In the case where activation of the polymer end is performed using the mixture as a raw material, an impurity in which the end of the unreacted polyethylene glycol has been also activated is formed as a by-product. When the activated polyethylene glycol containing such an impurity is used for drug modification, a drug modified with the polyethylene glycol containing no acetal linker is formed as a result, so that a large influence is exerted on the in vivo kinetics and physical properties of the drug. Therefore, it is necessary to remove the polyethylene glycol impurity before the reaction with the drug but, in the case of the production in an industrial scale, there is a possibility that the separation and removal of the polymer impurity becomes a severe evil in technical and cost aspects.

As another method for obtaining an acetal compound, there is a method of reacting an alcohol with a vinyl ether under acidic conditions. For example, in Non-Patent Document 1, polyethylene glycol derivatives having various functional groups bound via ethylidene acetal linkers have been synthesized by reacting vinyl ethers having various functional groups with polyethylene glycol. However, also in this document, evaluation data of hydrolyzability are not shown.

In the synthetic method described in Non-Patent Document 1, since the vinyl ether that is a low-molecular compound is used in an excess amount to polyethylene glycol, so much amount of unreacted polyethylene glycol does not remain. However, the acetal group to be introduced by the synthetic method contains an ethylidene acetal structure, the type of the acetal group that can be introduced is limited. In the case of introducing a benzylidene acetal group, the type is necessarily a ketal structure. Since the ketal structure is sensitive to an acid, a dimer impurity in which two chains of polyethylene glycol are bound via a ketal group is much formed as a by-product by a ketal exchange reaction in the synthetic method. Accordingly, the synthetic method described in Non-Patent Document 1 is difficult to apply to the synthesis of a polyethylene glycol derivative having a benzylidene acetal linker.

On the other hand, in Non-Patent Document 2, several types of polyethylene glycol derivatives in which a low-molecular model drug is bound via an aliphatic or benzylidene acetal linker are synthesized by synthesizing a unit having an acetal group, which has been formed with utilizing the hydroxyl group of the low-molecular model drug, and condensing the unit with a separately synthesized activated polyethylene glycol derivative. In this case, although it is shown that a difference in the structure around the acetal group affects the hydrolysis rate, i.e., the detaching rate of the polyethylene glycol chain, the correlation between the rate and the structure around the acetal group has not been clarified and hence it can not be said that the hydrolyzability can be controlled. Also, since the method is a method of forming an acetal group with utilizing the hydroxyl group of the low-molecular model drug, it is difficult to use the method in the chemical modification of proteins, drug carriers, and the like other than low-molecular drugs.

As mentioned above, although there are many examples of hydrophilic polymer derivatives each having an acetal linker introduced into the structure for the purpose of detaching the hydrophilic polymer chain under an acidic environment in the living body, there is no example with regard to the hydrophilic polymer derivative in which the hydrolysis rate of the acetal linker, i.e., the detaching rate of the hydrophilic polymer chain is accurately controlled in an optional pH.

PRIOR ART DOCUMENTS

Patent Documents

Patent Document 1: WO2005/108463 pamphlet

Non-Patent Document

Non-Patent Document 1:57th Annual Meeting of The Society of Polymer Science, Japan, Preprints of The Society of Polymer Science, Japan, 57, 1897 (May, 2008)
Non-Patent Document 2: Bioconjugate Chem. 2004, 15, 1254-1263

SUMMARY OF THE INVENTION

Problems that the Invention is to Solve

The deviation of pH at each part of the living body is very small and, for example, although the periphery of a tumor tissue is an acidic environment as compared to pH 7.4 in normal tissues, the pH is approximately 6.0, which is weakly acidic. Also, an endosomal interior shows pH 5.5 to 6.0 and is slightly acidic, and the endosomal interior is gradually acidified and approaches to pH 4.5 to 5.0 that is the pH of a lysosome. Since an endosome is finally fused with a lysosome, it is required that the drug or the like incorporated into the endosome should escape from the endosome at around pH 5.5, in order to avoid degradation thereof by lysosomal enzymes. Thus, in the case where it is intended to control in vivo/intercellular kinetics such as site-selective cellular uptake and endosome escape of a drug or the like by detaching a hydrophilic polymer chain with utilizing a slight difference in pH at each part of the living body such as the periphery of a tumor tissue or an endosomal interior, it is necessary to accurately control the hydrolysis rate of the acetal linker at the pH of the weakly acidic environment in the living body.

An object of the present invention is to provide a hydrophilic polymer derivative having an acetal linker whose hydrolysis rate at the pH of a weakly acidic environment in the living body can be accurately controlled.

Means for Solving the Problems

As a result of extensive studies for solving the above problem, the present inventors have developed a hydrophilic polymer derivative having a benzylidene acetal linker whose hydrolysis rate at the pH of a weakly acidic environment in the living body can be accurately controlled.

The most prominent feature of the present invention lies in the fact that a chemically reactive functional group and a hydrophilic polymer are bound via a benzylidene acetal linker having substituent(s). By appropriately selecting the type and position of the substituent(s) on the benzene ring of the benzylidene acetal linker, it is possible to adjust the degree of electron density and steric hindrance around the acetal group which affects the hydrolysis rate of the acetal linker. Based on this feature, it is possible to impart a desired hydrolysis rate to the acetal linker and it becomes possible to detach the hydrophilic polymer chain at any rate from the drug or the like that is bound to the hydrophilic polymer derivative.

The hydrophilic polymer derivative of the invention can be synthesized by the coupling reaction of a linker unit, into which a benzylidene acetal group having substituent(s) is introduced, and a hydrophilic polymer precursor. Therefore, it is not necessary to use such an excess amount of the hydrophilic polymer for the acetal group formation as in Patent Document 1 and the removal of the unreacted hydrophilic polymer impurity is not required, so that it is easy to perform the production on an industrial scale. Moreover, there is no limitation on the type of the acetal group that can be introduced and a benzylidene acetal group that cannot be introduced by the synthetic method of Non-Patent Document 1 can also be introduced. Furthermore, unlike Non-Patent Document 2, in the hydrophilic polymer derivative of the invention, since various functional groups can be introduced at the end of the acetal linker, it is possible to form covalent bonds with various bio-functional molecules and drug carriers.

That is, the present invention is as follows.

[1] A hydrophilic polymer derivative having a benzylidene acetal linker, which is represented by the following formula (1):

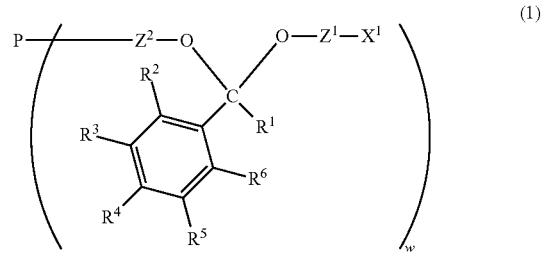

wherein $R^1$ is a hydrogen atom or a hydrocarbon group;
$R^2$, $R^3$, $R^4$, $R^5$, and $R^6$ are each independently a hydrogen atom or a substituent and at least one of $R^3$, $R^4$, and $R^5$ is an electron-withdrawing substituent or at least one of $R^2$ and $R^6$ is a substituent;
$X^1$ is a chemically reactive functional group;
is a hydrophilic polymer;
w is an integer of 1 to 8; and
$Z^1$ and $Z^2$ are an independently selected divalent spacer.

[2] The hydrophilic polymer derivative of [1], wherein $R^2$ and $R^6$ are a hydrogen atom and a sum ($\Sigma\sigma$) of substituent constants ($\sigma$) in $R^3$, $R^4$, and $R^5$ is 0.16 or more and 1.37 or less.

[3] The hydrophilic polymer derivative of [1], wherein at least one of $R^2$ and $R^6$ is a substituent and a sum ($\Sigma\sigma$) of substituent constants ($\sigma$) in $R^2$, $R^3$, $R^4$, $R^5$, and $R^6$ is −1.12 or more and 1.20 or less.

[4] The hydrophilic polymer derivative of any one of [1] to [3], wherein $X^1$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group.

[5] The hydrophilic polymer derivative of any one of [1] to [4], wherein $X^1$ is selected from the group consisting of the formula (a), the formula (b), the formula (c), the formula (d), the formula (e), the formula (f), the formula (g), the formula (h), the formula (i), the formula (j), the formula (k), the formula (l), the formula (m), and the formula (n):

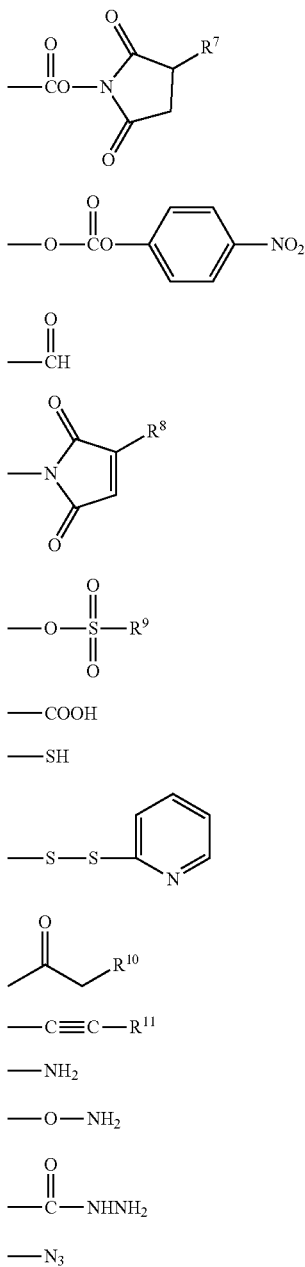

wherein $R^7$ is a hydrogen atom or a sulfo group;

$R^8$ and $R^{11}$ are independently a hydrogen atom or a hydrocarbon group having 1 to 5 carbon atoms;

$R^9$ is a hydrocarbon group having 1 to 10 carbon atoms, which may contain a halogen atom; and $R^{10}$ is a halogen atom selected from a chlorine atom, a bromine atom, and an iodine atom.

[6] The hydrophilic polymer derivative of any one of [1] to [5], wherein $Z^1$ and $Z^2$ are independently a saturated hydrocarbon group which may have a bond selected from an ether bond, an ester bond, a carbonate bond, a urethane bond, an amide bond, and a secondary amino group.

[7] A polyethylene glycol derivative of any one of [1] to [6], wherein P is a linear polyethylene glycol having a hydrocarbon group or a chemically reactive functional group at an end.

[8] The polyethylene glycol derivative of [7], wherein w is 1 and P is represented by the formula (2):

wherein Y is a hydrocarbon group having 1 to 24 carbon atoms; and n is an integer of 3 to 2000.

[9] The polyethylene glycol derivative of [7], wherein w is 1 and P is represented by the formula (3):

wherein $X^2$ is a chemically reactive functional group different from $X^1$;

$Z^3$ is a divalent spacer; and n is an integer of 3 to 2000.

[10] The polyethylene glycol derivative of any one of [1] to [6], wherein P is a branched polyethylene glycol having a hydrocarbon group or a chemically reactive functional group different from $X^1$ at an end.

[11] The polyethylene glycol derivative of [10], wherein w is 1 and P is represented by the formula (4):

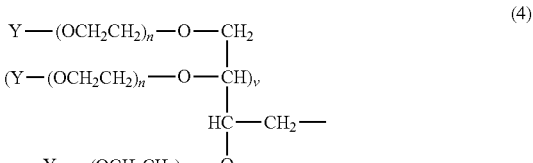

wherein Y is a hydrocarbon group having 1 to 24 carbon atoms;

n is an integer of 3 to 1000; and v is 0 or 2.

[12] The polyethylene glycol derivative of [10], wherein w is 1 and P is represented by the formula (5):

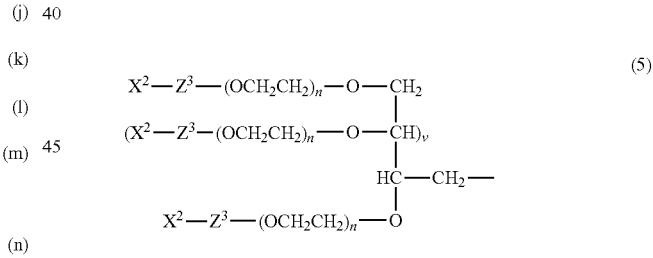

wherein $X^2$ is a chemically reactive functional group different from $X^1$;

$Z^3$ is a divalent spacer;

n is an integer of 3 to 1000; and v is 0 or 2.

[13] The polyethylene glycol derivative of [10], wherein w is v+2 and P is represented by the formula (6):

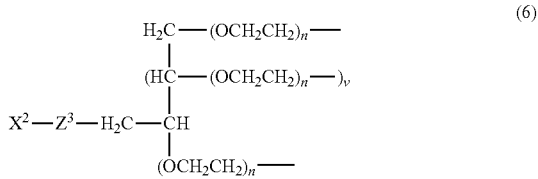

wherein X² is a chemically reactive functional group different from X¹;

Z³ is a divalent spacer;

n is an integer of 3 to 1000; and v is 0 or 2.

[14] The polyethylene glycol derivative of any one of [9], [12], or [13], wherein X² is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group.

[15] The polyethylene glycol derivative of any one of [9], [12], or [13], wherein X² is selected from the group consisting of the formula (a), the formula (b), the formula (c), the formula (d), the formula (e), the formula (f), the formula (g), the formula (h), the formula (i), the formula (j), the formula (k), the formula (l), the formula (m), and the formula (n):

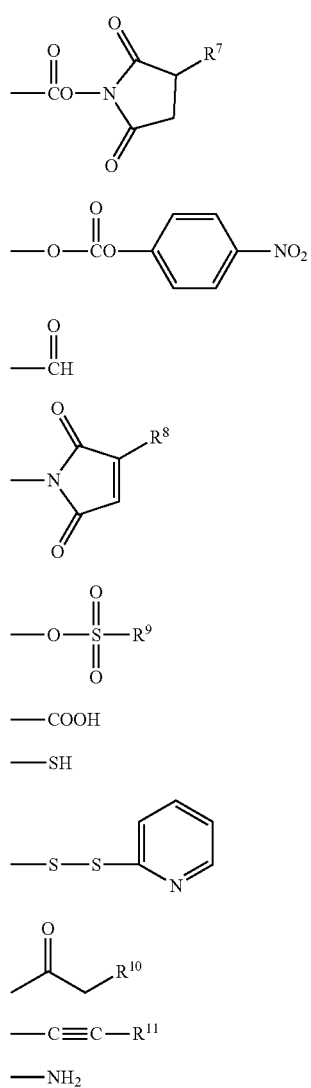

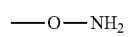

(l)

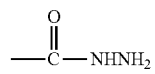

(m)

(n)

wherein R⁷ is a hydrogen atom or a sulfo group;

R⁸ and R¹¹ are independently a hydrogen atom or a hydrocarbon group having 1 to 5 carbon atoms;

R⁹ is a hydrocarbon group having 1 to 10 carbon atoms, which may contain a halogen atom; and R¹⁰ is a halogen atom selected from a chlorine atom, a bromine atom, and an iodine atom.

[16] The polyethylene glycol derivative of any one of [9], [12], or [13], wherein Z³ is a saturated hydrocarbon group which may have a bond selected from an ether bond, an ester bond, a carbonate bond, a urethane bond, an amide bond, and a secondary amino group.

[17] The polyethylene glycol derivative of any one of [1] to [6], wherein P is a polyethylene glycol having an end number of 2 to 8, all the ends of the polyethylene glycol constituting P are each bound to Z², and w is equal to the end number of the polyethylene glycol.

[18] The polyethylene glycol derivative according to claim 17, wherein P is selected from the group consisting of the formula (r), the formula (s), the formula (t), the formula (u), and the formula (v):

(r)

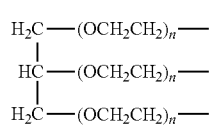

(s)

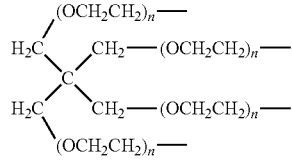

(t)

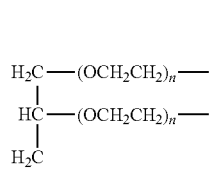

(u)

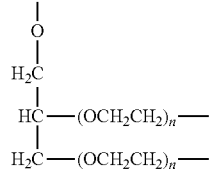

-continued

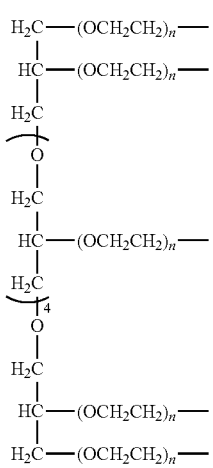

(v)

wherein n is an integer of 3 to 2000 and w is 2 when P is represented by the formula (r), w is 3 when P is represented by the formula (s), w is 4 when P is represented by the formula (t), w is 4 when P is represented by the formula (u), and w is 8 when P is represented by the formula (v).

Advantage of the Invention

In the hydrophilic polymer derivative having a benzylidene acetal linker according to the invention, the hydrolytic rate of the benzylidene acetal linker can be controlled according to the pH of a weakly acidic environment in the living body and it is possible to selectively detach the hydrophilic polymer chain from a drug or the like bound to the hydrophilic polymer derivative at the pH of the target portion. Therefore, it is possible to fundamentally eliminate problems such as inhibition of intracellular uptake and endosome escape resulting from hydrated layer formation of a hydrophilic polymer, which are disadvantages of the conventional hydrophilic polymer modification, by detaching the hydrophilic polymer chain after a biofunctional molecule or drug carrier bound to the hydrophilic polymer derivative has been transported to the tissue or site to be targeted. That is, by using the hydrophilic polymer derivative in the chemical modification of drugs and the like, it is possible to impart only the advantages of hydrophilic polymer modification, such as an increase in water solubility and bioavailability and prolongation of circulation time in blood, without interfering the expression of original function of the drugs and the like.

MODES FOR CARRYING OUT THE INVENTION

Figure 1:
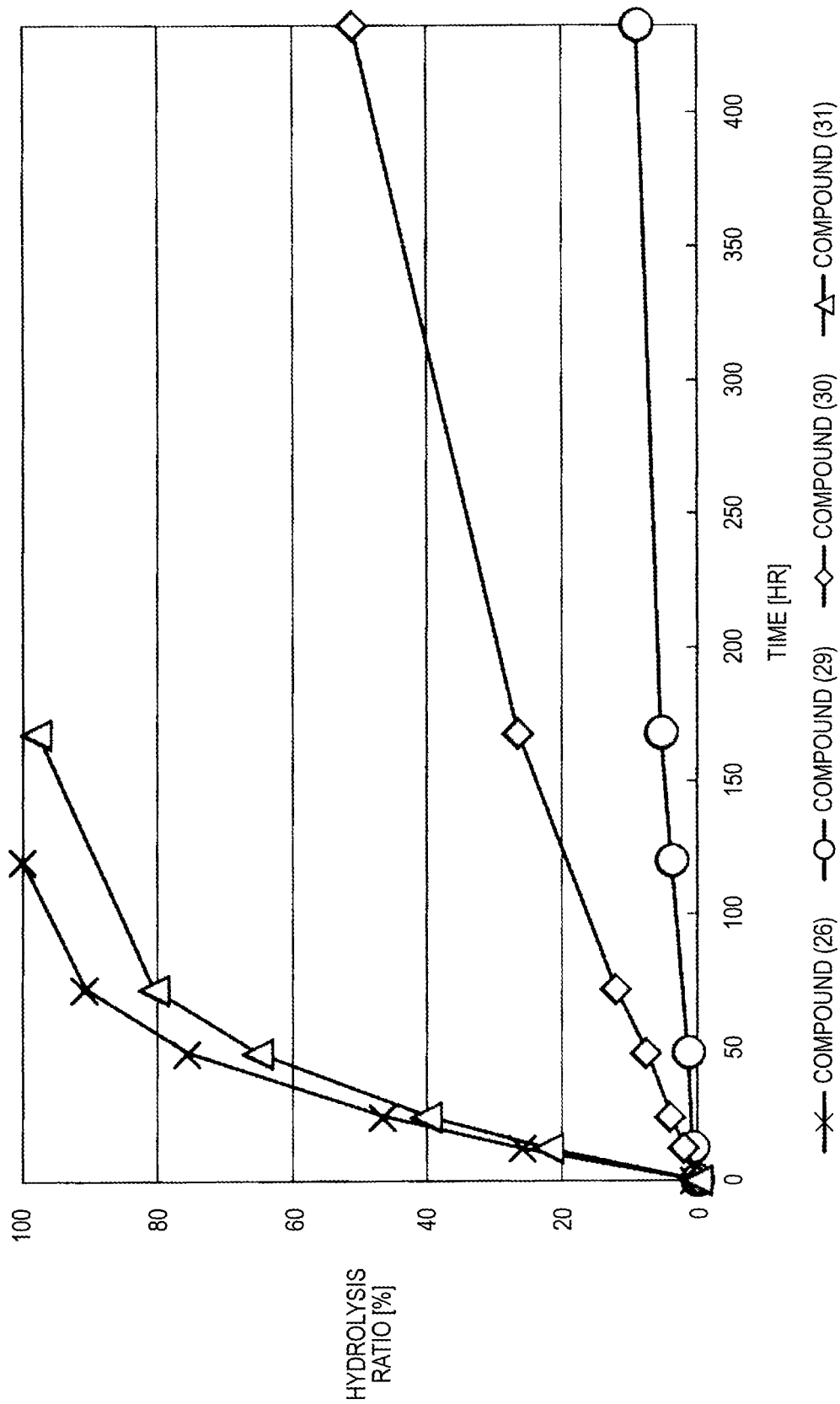
FIG. 1 Results of the hydrolysis test in MES deuterated water buffer at pD 5.5 at 37° C. using the compounds of the formula (26), the formula (29), the formula (30), and the formula (31) described in Examples.

The following will describe the present invention in detail.

The term "acetal" as used herein means both of an acetal structure derived from an aldehyde and an acetal structure derived from a ketone, i.e., a ketal structure.

$R^1$ in the formula (1) of the invention is a hydrogen atom or a hydrocarbon group, and the carbon number of the hydrocarbon group is preferably 10 or less and specific hydrocarbon groups include a methyl group, an ethyl group, a propyl group, an isopropyl group, a t-butyl group, a phenyl group, a benzyl group, and the like. A preferred embodiment of $R^1$ is a hydrogen atom or a methyl group and more preferred is a hydrogen atom.

The benzene ring in the formula (1) of the invention may have a plurality of substituents and, by appropriately selecting the type and position of the substituents on the benzene ring, it is possible to adjust the degree of electron density and steric hindrance around the acetal group, which affects the hydrolysis rate of the acetal linker. This makes it possible to impart a desired hydrolysis rate to the acetal linker.

In the present specification, the substituent(s) on the benzene ring in the formula (1) is described using the "substituent constant (σ)", which means the substituent constant in the Hammett's rule that quantifies the effect of the substituent(s) on the reaction rate or equilibrium of benzene derivatives. However, as is known, the Hammett's rule is applied only to para-substituted and meta-substituted benzene derivatives and cannot be applied to ortho-substituted benzene derivatives that are affected by steric hindrance. Therefore, in the case of ortho-substituted benzene derivatives, the substituent constant means the substituent constant in the Taft's equation that extends the above Hammett's rule.

In the above para-substituted and meta-substituted benzene derivatives, the Hammett's rule is represented by the following formula (7).

$$\log(k/k_0) = \rho\sigma \quad (7)$$

wherein k is a rate constant or equilibrium constant in any reactions of para-substituted and meta-substituted benzene derivatives, $k_0$ is a rate constant or equilibrium constant in the case where the above benzene derivatives do not have any substituent, that is, the substituent is a hydrogen atom, ρ is a reaction constant, and σ is a substituent constant.

The reaction constant (ρ) in the above formula (7) is a constant that is determined depending on reaction conditions such as the type of reaction, temperature, and solvent, and can be calculated from the slope of Hammett plots. In the acid hydrolysis reaction of the hydrophilic polymer derivative having a benzylidene acetal linker of the invention, the constant is calculated as "ρ=−3.0" from the results of the hydrolysis tests performed for the compounds of the formula (26), the formula (29), the formula (30), and the formula (31).

The substituent constant (σ) in the above formula (7) is a constant that is determined only depending on the type and position of the substituent(s), regardless of the type of reaction. In the case where no substituent is present, that is, the substituent is a hydrogen atom, the constant is "0". The term "electron-withdrawing" as used herein means the case where σ is a positive value and the term "electron-donating" means the case where σ is a negative value.

As described above, the Hammett's rule is applied only to para-substituted and meta-substituted benzene derivatives and cannot be applied to the case of ortho-substituted benzene derivatives that are affected by steric hindrance. Therefore, the effect of such steric hindrance is introduced as a factor of the position, i.e., a position constant (Es) of the substituent(s), to extend the Hammett's rule so that it can be applied to the case of the ortho-substituted benzene derivatives, and the resultant is the Taft's equation. The Taft's equation is represented by the following formula (8).

$$\log(k/k_0)=\rho^*\sigma^*+Es \quad (8)$$

wherein k is a rate constant or equilibrium constant in any reactions of para-substituted and meta-substituted benzene derivatives, $k_0$ is a rate constant or equilibrium constant in the case where the benzene derivatives do not have any substituent, that is, the substituent is a hydrogen atom, $\rho^*$ is a reaction constant, $\sigma^*$ is a substituent constant, and Es is a position constant of the substituent(s).

As is known, since the reaction constants ($\rho$) of para-substituted and meta-substituted benzene derivatives and the reaction constant ($\rho^*$) of ortho-substituted benzene derivatives are approximately equal, it is defined herein that $\rho$ and $\rho^*$ are the same. Since the substituent constant ($\sigma^*$) in the ortho position is similar to the substituent constant in the para position, for example, as described in "Charton, M. Can. J. Chem. 1960, 38 2493-2499", a corresponding substituent constant in the para position is applied to the substituent constant in the ortho position herein.

The substituent constants ($\sigma$) in the para position and the meta position are described in "Hansch, C.; Leo, A.; Taft, R. W. Chem. Rev. 1991, 91, 165-195" and, with regard to a substituent for which the substituent constant ($\sigma$) is unknown, the constant can be measured and determined by the method described in "Hammett, L. P. Chem. Rev. 1935, 17(1), 125-136". In addition, the position constant (Es) is described in "Unger, S. H.; Hansch, C. Prog. Phys. Org. Chem. 1976, 12, 91-118". However, Es as used herein is one where a hydrogen atom is defined as "0".

In the formula (1), in the case where a plurality of substituents are present on the benzene ring, it is defined that additivity is established for the substituent constant ($\sigma$) and the position constant (Es) thereof, and the sum of $\sigma$ is represented by "$\Sigma\sigma$" and the sum of Es is represented by "$\Sigma Es$".

With regard to a suitable hydrolysis rate of the hydrophilic polymer derivative having a benzylidene acetal linker of the invention, hydrolysis half life ($t_{1/2}$) in a buffer at pH 5.5 and 37° C. is in the range of 1 hour to 6 months, more preferably in the range of 1 hour to 1 month, and further preferably in the range of 1 hour to 24 hours. In this specification, using a numerical value derived from the compound of the formula (26) described in Examples, in which $t_{1/2}$ under the above hydrolysis conditions is 24 hours, a suitable range of the sum ($\Sigma\sigma$) of substituent constants of the invention is defined. When $\log(k/k_0)$ for the compound of the formula (26) is calculated using the Taft's equation (8), the following equation (9) is obtained.

$$\log(k/k_0)=-3.0\times 0.23-1.16=-1.85 \quad (9)$$

wherein −3.0 represents a reaction constant ($\rho$), 0.23 represents the sum ($\Sigma\sigma$) of substituent constants, and −1.16 represents the sum ($\Sigma Es$) of position constants.

When the sum ($\Sigma\sigma$) of substituent constants that $t_{1/2}$ is 24 hours is calculated using the above equations (9) and (7) in the case where $R^2$ and $R^6$ in the formula (1) are a hydrogen atom, the following equation (10) is obtained.

$$\log(k/k_0)=-3.0\times\Sigma\sigma=-1.85$$

$$\Sigma\sigma=0.62 \quad (10)$$

Moreover, in the case where $R^2$ and $R^6$ in the formula (1) are a hydrogen atom, when $\log(k'/k_0)$ is calculated with taking the rate constant at the time when $t_{1/2}$ is 1 hour as k', the following equation (11) is obtained.

$$\log(k'/k)=\log(24k/k)=1.38$$

When the equation is modified, $$\log(k'/k)=\log [(k'/k_0)/(k/k_0)]=1.38$$

$$\log(k'/k_0)-\log(k/k_0)=1.38$$

When the above equation (9) is substituted, $$\log(k'/k_0)-(-1.85)=1.38$$

$$\log(k'/k_0)=-0.47 \quad (11)$$

Here, when the sum ($\Sigma\sigma$) of the substituent constants is calculated using the above equations (11) and (7), the following equation (12) is obtained.

$$\log(k'/k_0)=-3.0\times\Sigma\sigma=-0.47$$

$$\Sigma\sigma=0.16 \quad (12)$$

From the equation (10) and the equation (12), in the case where $R^2$ and $R^6$ in the formula (1) is a hydrogen atom, $t_{1/2}$ of the hydrophilic polymer derivative is 1 hour or more and 24 hours or less at the time of $0.16\leq\Sigma\sigma\leq 0.62$. Similarly, the calculation of the ranges of $\Sigma\sigma$ at 1 hour$\leq t_{1/2}\leq 1$ month and 1 hour$\leq t_{1/12}\leq 6$ months results in the following: $0.16\leq\Sigma\sigma\leq 1.11$ at the time of 1 hour$\leq t_{1/2}\leq 1$ month and $0.16\leq\Sigma\sigma\leq 1.37$ at the time of 1 hour$\leq t_{1/2}\leq 6$ months, respectively.

The substituent that can be used in the invention is an electron-withdrawing or electron-donating substituent that do not inhibit the acetalization reaction of the benzylidene acetal linker in the synthetic process of the hydrophilic polymer derivative, the coupling reaction of the benzylidene acetal linker with the polyethylene glycol precursor and the end functional group conversion reaction of the hydrophilic polymer derivative, and further the bond-forming reaction between the hydrophilic polymer derivative and the drug or the like.

The electron-withdrawing substituent includes an acyl group having 2 to 5 carbon atoms, an alkoxycarbonyl group having 2 to 5 carbon atoms, a carbamoyl group having 2 to 5 carbon atoms, an acyloxy group having 2 to 5 carbon atoms, an acylamino group having 2 to 5 carbon atoms, an alkoxycarbonylamino group having 2 to 5 carbon atoms, a fluorine atom, a chlorine atom, a bromine atom, an iodine atom, an alkylsulfanyl group having 1 to 4 carbon atoms, an alkylsulfonyl group having 1 to 4 carbon atoms, an arylsulfonyl group of 6 to 10 carbon atoms, a nitro group, a trifluoromethyl group, and a cyano group, and preferred examples include a trifluoromethyl group, a cyano group, an acetyl group, a methoxycarbonyl group, a methylcarbamoyl group, an acetoxy group, an acetamide group, a methoxyarbonylamino group, a fluorine atom, a chlorine atom, a bromine atom, an iodine atom, a methylsulfanyl group, a phenylsulfonyl group, and a nitro group. The electron-donating substituent is an alkyl group having 1 to 4 carbon atoms and preferred examples include a methyl group, an ethyl group, a propyl group, an isopropyl group, and a t-butyl group. The substituent that is an electron-withdrawing group in the meta-position and an electron-donating group in the para-position is an alkoxy group having 1 to 4 carbon atoms, an aryl group having 6 to 10 carbon atoms, or an aryloxy group having 6 to 10 carbon atoms and preferred examples include a phenyl group, a methoxy group, an ethoxy group, a propoxy group, an isopropoxy group, a t-butoxy group, a phenoxy groups, and the like.

In the case where at least one of $R^2$ and $R^6$ in the formula (1) is a substituent other than a hydrogen atom, by using the position constant (Es) of the phenyl group that the influence of steric hindrance is largest and the fluorine atom that the influence of steric hindrance is smallest, among the substituents, the calculation of the ranges of $\Sigma\sigma$ in a buffer at pH 5.5 and 37° C. at 1 hour≤$t_{1/2}$≤24 hours, 1 hour≤$t_{1/2}$≤1 month, and 1 hour $t_{1/2}$ 6 months results in the following: $-1.12\leq\Sigma\sigma\leq0.45$ at the time of 1 hour≤$t_{1/2}$≤24 hours, $-1.12\leq\Sigma\sigma\leq0.94$ at the time of 1 hour≤$t_{1/2}$≤1 month, and $-1.12\leq\Sigma\sigma\leq1.20$ at the time of 1 hour≤$t_{1/2}$≤6 months, respectively.

In the case where $R^2$ and $R^6$ in the formula (1) is a hydrogen atom, at least one of $R^3$ to $R^5$ is an electron-withdrawing substituent since $\Sigma\sigma$ is a positive value and $R^3$ to $R^5$ other than the above may be an electron-donating substituent. For example, in a preferred embodiment which satisfies $0.16\leq\Sigma\sigma\leq0.62$ at the time of 1 hour≤$t_{1/2}$≤24 hours, one of $R^3$ to $R^5$ in the formula (1) is a substituent selected from the group consisting of a trifluoromethyl group, a cyano group, an acetyl group, a methoxycarbonyl group, and a nitro group, and is more preferably a trifluoromethyl group or a cyano group. In another preferred embodiment, one of $R^3$ to $R^5$ in the formula (1) is a substituent selected from the group consisting of a trifluoromethyl group, a cyano group, an acetyl group, a methoxycarbonyl group, and a nitro group and one of $R^3$ to $R^5$ other than the above is a substituent selected from the group consisting of a methyl group, an ethyl group, a propyl group, an isopropyl group, a butyl group, a t-butyl group, a phenyl group, a methoxy group, an ethoxy group, and an acetamide group. More preferably, one of $R^3$ to $R^5$ is a trifluoromethyl group, a cyano group, or a nitro group, and one of $R^3$ to $R^5$ other than the above is a methyl group, an ethyl group, a propyl group, or a methoxy group. In still another preferred embodiment, two of $R^3$ to $R^5$ in the formula (1) are substituents independently selected from the group consisting of a fluorine atom, a chlorine atom, a bromine atom, and an iodine atom and is more preferably substituents independently selected from the group consisting of a chlorine atom, a bromine atom, and an iodine atom.

Moreover, in the case where at least one of $R^2$ and $R^6$ in the formula (1) is a substituent other than a hydrogen atom, for example, the following will show preferred embodiment which satisfies $-1.12\leq\Sigma\sigma\leq0.45$ at the time of 1 hour≤$t_{1/2}$≤24 hours. When one of at least one of $R^2$ and $R^6$ in the formula (1) is a fluorine atom or a methoxy group and another one is a hydrogen atom, one of $R^3$ to $R^5$ is a substituent selected from the group consisting of a trifluoromethyl group, a cyano group, an acetyl group, a methoxycarbonyl group, and a nitro group, and is more preferably a trifluoromethyl group or a cyano group. In the case where at least one of $R^2$ and $R^6$ in the formula (1) is a cyano group, one of $R^3$ to $R^5$ is a substituent selected from the group consisting of a methyl group, an ethyl group, a propyl group, an isopropyl group, a butyl group, a t-butyl group, a phenyl group, a methoxy group, an ethoxy group, and an acetamide group, and is more preferably a methyl group, an ethyl group, or a methoxy group. When $R^2$ and $R^6$ in the formula (1) is independently a fluorine atom or a methoxy group, one of $R^3$ to $R^5$ is a substituent selected from the group consisting of a trifluoromethyl group, an acetyl group, a methoxycarbonyl group, a phenyl group, a fluorine atom, a chlorine atom, a bromine atom, and an iodine atom, and is more preferably a trifluoromethyl group, a phenyl group, or a fluorine atom. When one of $R^2$ and $R^6$ in the formula (1) is a methyl group or an ethyl group and another one is a hydrogen atom, one of $R^3$ to $R^5$ is a substituent selected from the group consisting of an acetyl group, a methoxycarbonyl group, a fluorine atom, a chlorine atom, a bromine atom, and an iodine atom, and is more preferably a fluorine atom, a chlorine atom, a bromine atom, or an iodine atom. When one of $R^2$ and $R^6$ in the formula (1) is a chlorine atom, a bromine atom, or an iodine atom and another one is a hydrogen atom, $R^3$ to $R^5$ are a hydrogen atom or one of $R^3$ to $R^5$ is a phenyl group or an acetamide group, and is more preferably a hydrogen atom. When one of $R^2$ and $R^6$ in the formula (1) is a propyl group, an isopropyl group, or a butyl group and another one is a hydrogen atom, one of $R^3$ to $R^5$ is a fluorine atom, a chlorine atom, a bromine atom, or an iodine atom, and is more preferably a chlorine atom, a bromine atom, or an iodine atom. When one of $R^2$ and $R^6$ in the formula (1) is a substituent selected from the group consisting of a t-butyl group, a phenyl group, a trifluoromethyl group, and a nitro group and another one is a hydrogen atom, two of $R^3$ to $R^5$ are a substituent selected from the group consisting of a methyl group, an ethyl group, a propyl group, an isopropyl group, a butyl group, a t-butyl group, a methoxy group, an ethoxy group, and an acetamide group, and more preferably, two of $R^3$ to $R^5$ are a substituent selected from the group consisting of a methyl group, an ethyl group, a t-butyl group, a methoxy group, and an acetamide group. When $R^2$ and $R^6$ in the formula (1) are independently a substituent selected from the group consisting of a methyl group, an ethyl group, a propyl group, an isopropyl group, a butyl group, a chlorine atom, a bromine atom, and an iodine atom, two of $R^3$ to $R^5$ are a substituent selected from the group consisting of a methyl group, an ethyl group, a propyl group, an isopropyl group, a butyl group, a t-butyl group, a methoxy group, an ethoxy group, and an acetamide group, and more preferably, two of $R^3$ to $R^5$ are a substituent selected from the group consisting of a methyl group, an ethyl group, a t-butyl group, a methoxy group, and an acetamide group.

As mentioned above, the type and position of the substituent(s) suitable for imparting desirable hydrolyzability to the hydrophilic polymer derivative having a benzylidene acetal linker of the invention can be reasonably set by performing the aforementioned calculation using the equations (7), (8), and (9).

$X^1$ in the formula (1) of the invention is not particularly limited as long as it is a functional group that forms a covalent bond through the reaction with a functional group present in each of biofunctional molecules such as physiologically active proteins, peptides, antibodies, nucleic acids, and low-molecular drugs and drug carriers such as liposomes and polymer micelles to be an object of chemical modification. For example, there may be mentioned functional groups described in "Harris, J. M. Poly(Ethylene Glycol) Chemistry; Plenum Press: New York, 1992", "Hermanson, G. T. Bioconjugate Techniques, 2nd ed.; Academic Press: San Diego, Calif., 2008", and "PEGylated Protein Drugs: Basic Science and Clinical Applications; Veronese, F. M., Ed.; Birkhauser: Basel, Switzerland, 2009"; and the like.

Preferred examples of $X^1$ include an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group. More specifically, the functional group capable of forming a covalent bond through the reaction with an amino group of each of the biofunctional molecules is an active ester group, an active carbonate group, an aldehyde group, an isocyanate group, an isothiocyanate group, an epoxy group, a maleimide group, a vinyl sulfone group, an acryl group, a sulfonyloxy group, or a carboxy group, the functional group capable of forming a covalent bond through the reaction with a thiol group of each of the biofunctional molecules is an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, or a vinyl group, the functional group capable of forming a covalent bond through the reaction with an aldehyde group or carboxy group of each of the biofunctional molecules is a thiol group, an amino group, an oxyamino group, or a hydrazide group, the functional group capable of forming a covalent bond through the reaction with an alkylyl group of each of the biofunctional molecules is a thiol group or an azide group, and the functional group capable of forming a covalent bond through the reaction with an azide group of each of the biofunctional molecules is an alkynyl group.

Here, the term "active ester" refers to an activated carboxy group represented by the formula: —C(=O)-L, and L represents a leaving group. The leaving group represented by L includes a succinimidyloxy group, a phthalimidyloxy group, a 4-nitrophenoxy group, a 1-imidazolyl group, a pentafluorophenoxy group, a benzotriazol-1-yloxy group, a 7-azabenzotriazol-1-yloxy group, and the like. The term "active carbonate" indicates an activated carbonate group represented by the formula: —O—C(=O)-L, and L represents the same leaving group as described above.

In a preferred embodiment of the invention, $X^1$ is a group represented by the group (I), the group (II), the group (III), the group (IV), and the group (V).

Group (I): functional groups each capable of forming a covalent bond through the reaction with an amino group of each of the biofunctional molecules
The following (a), (b), (c), (d), (e), and (f)

Group (II): functional groups each capable of forming a covalent bond through the reaction with a thiol group of each of the biofunctional molecules
The following (a), (b), (c), (d), (e), (f), (g), (h), (i), and (j)

Group (III): functional groups each capable of forming a covalent bond through the reaction with an aldehyde group or carboxy group of each of the biofunctional molecules
The following (g), (k), (l), and (m)

Group (IV): functional groups each capable of forming a covalent bond through the reaction with an alkynyl group of each of the biofunctional molecules
The following (g), (k), (1), (m), and (n)

Group (V): functional groups each capable of forming a covalent bond through the reaction with an azide group of each of the biofunctional molecules The following (j)

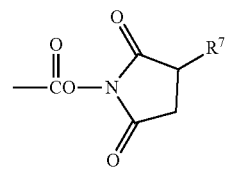
(a)

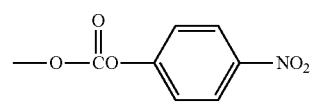
(b)

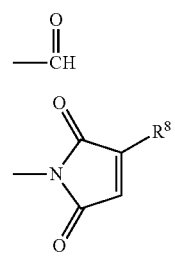
(c)

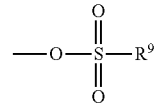
(d)

(e)

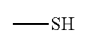
(f)

—COOH

—SH
(g)

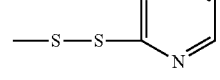
(h)

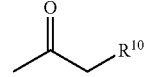
(i)

—C≡C—R$^{11}$
(j)

—NH$_2$
(k)

—O—NH$_2$
(l)

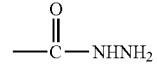
(m)

—N$_3$
(n)

In the formula, $R^7$ is a hydrogen atom or a sulfo group and, as the sulfo group, sodium sulfonate and potassium sulfonate may be mentioned, but preferred is a hydrogen atom. $R^8$ and $R^{11}$ are a hydrogen atom or a hydrocarbon group having 1 to 5 carbon atoms and specific hydrocarbon groups include a methyl group, an ethyl group, a propyl group, an isopropyl group, a butyl group, a t-butyl group, a pentyl group, and the like. $R^9$ is a hydrocarbon group having 1 to 10 carbon atoms which may contain a halogen atom, and specific hydrocarbon groups include a methyl group, an ethyl group, a propyl group, an isopropyl group, a butyl group, a t-butyl group, a pentyl group, an isopentyl group, a hexyl group, a benzyl group, a 4-methylphenyl group, a trifluoromethyl group, a 2,2,2-trifluoroethyl group, a 4-(trifluoromethoxy)phenyl group, a vinyl group, a chloroethyl group, a bromoethyl group, an iodoethyl group, and the like, and preferred is a methyl group, a vinyl group, a 4-methylphenyl group, or a 2,2,2-trifluoroethyl group. $R^{10}$ is a halogen atom selected from a chlorine atom, a bromine atom, and an iodine atom.

$Z^1$ in the formula (1) of the invention is a divalent spacer between the functional group $X^1$ and the benzylidene acetal linker and $Z^2$ is a divalent spacer between the benzylidene acetal linker and the hydrophilic polymer chain. They are composed of covalent bonds and are not particularly limited as long as they are more stable to acid hydrolysis than the benzylidene acetal linker is, and are preferably an alkylene group alone or an alkylene group having bond(s) selected from an ether bond, an ester bond, a carbonate bond, a urethane bond, an amide bond, and a secondary amino group in the alkylene chain or at the end. The number of the carbon atoms of the alkylene group is preferably from 1 to 24. By way of illustration and without limitation, preferable examples of the alkylene group include structures such as (z1). Preferable examples of the alkylene group having an ether bond include structures such as (z2) or (z3). Preferable examples of the alkylene group having an ester bond include structures such as (z4). Preferable examples of the alkylene group having a carbonate bond include structures such as (z5). Preferable examples of the alkylene group having a urethane bond include structures such as (z6). Preferable examples of the alkylene group having an amide bond include structures such as (z7). Preferable examples of the alkylene group having a secondary amino group include structures such as (z8). In a preferred embodiment, p and q are independently an integer of 1 to 12. For example, in the case where it is intended to bind the functional group $X^1$ in a hydrophobic environment such as the inside of a protein, p and q are preferably large and, in the case where it is intended to bind it in a hydrophilic environment, p and q are preferably small.

 (z1)

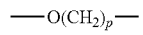 (z2)

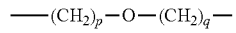 (z3)

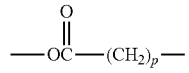 (z4)

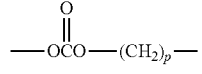 (z5)

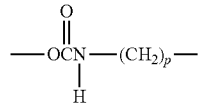 (z6)

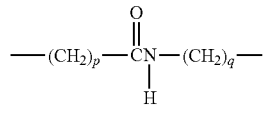 (z7)

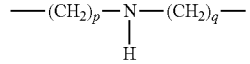 (z8)

P in the formula (1) of the invention is a hydrophilic polymer and specific examples thereof include polyalkylene glycols, polyoxazoline, polycarbonate, polyurethane, polyvinyl alcohol, polyacrylates, polymethacrylates, polyacrylamide, polyvinylpyrrolidone, polylactic acid, polyglycolic acid, polyamino acids, copolymers derived from the above polymers, and the like, and P is preferably a polyalkylene glycol, and more preferably polyethylene glycol.

The term "polyethylene glycol" as used herein means both of a polyethylene glycol having a molecular weight distribution obtained by the polymerization of ethylene oxide and a monodispersed polyethylene glycol resulting from combination of oligoethylene glycol having a single molecular weight by a coupling reaction.

In one aspect of the invention, P in the formula (1) is a linear type polyethylene glycol.

In a preferred embodiment of this aspect, P in the formula (1) is represented by the formula (2).

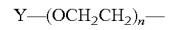 (2)

In the formula, n is the number of repeating units per polyethylene glycol chain and, in the polyethylene glycol having a molecular weight distribution, it is defined that n is calculate by various theoretical calculations based on the number-average molecular weight (Mn) of the compound.

In the formula, Y is a hydrocarbon group having 1 to 24 carbon atoms, specific examples thereof include a methyl group, an ethyl group, a propyl group, an isopropyl group, a butyl group, a t-butyl group, a pentyl group, an isopentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, a heneicosyl group, a docosyl group, a toicosyl group, a tetracosyl group, a phenyl group, a benzyl group, a cresyl group, a butylphenyl group, a dodecylphenyl group, a trityl group, and the like, and preferred is a hydrocarbon group having 1 to 10 carbon atoms, more preferred is a methyl group or an ethyl group, and further preferred is a methyl group.

In another preferred embodiment of this aspect, P in the formula (1) is represented by the formula (3).

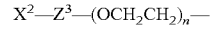 (3)

In the formula, $X^2$ is a chemically reactive functional group different from $X^1$, and $Z^3$ is a divalent spacer between the functional group $X^2$ and the polyethylene glycol chain. Since the polyethylene glycol derivative has two different reactive functional groups $X^1$ and $X^2$, it is possible to provide a polyethylene glycol-drug conjugate having a target directing property, for example, by binding a drug to $X^1$ and binding a targeting molecule to $X^2$.

Preferable examples of $X^2$ include an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group. More specifically, the functional group capable of forming a covalent bond through the reaction with an amino group of each of the biofunctional molecules is an active ester group, an active carbonate group, an aldehyde group, an isocyanate group, an isothiocyanate group, an epoxy group, a maleimide group, a vinyl sulfone group, an acryl group, a sulfonyloxy group, or a carboxy group, the functional group capable of forming a covalent bond through the reaction with a thiol group of each of the biofunctional molecules is an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, or a vinyl group, the functional group capable of forming a covalent bond through the reaction with an aldehyde group or carboxy group of each of the biofunctional molecules is a thiol group, an amino group, an oxyamino group, or a hydrazide group, the functional group capable of forming a covalent bond through the reaction with an alkylyl group of each of the biofunctional molecules is a thiol group or an azide group, and the functional group capable of forming a covalent bond through the reaction with an azide group of each of the biofunctional molecules is an alkynyl group.

In a preferred embodiment of the invention, $X^2$ is a group represented by the group (I), the group (II), the group (III), the group (IV), and the group (V).

Group (I): functional groups each capable of forming a covalent bond through the reaction with an amino group of each of the biofunctional molecules
The following (a), (b), (c), (d), (e), and (f)

Group (II): functional groups each capable of forming a covalent bond through the reaction with a thiol group of each of the biofunctional molecules
The following (a), (b), (c), (d), (e), (f), (g), (h), (i), and (j)

Group (III): functional groups each capable of forming a covalent bond through the reaction with an aldehyde group or carboxy group of each of the biofunctional molecules
The following (g), (k), (l), and (m)

Group (IV): functional groups each capable of forming a covalent bond through the reaction with an alkynyl group of each of the biofunctional molecules
The following (g), (k), (l), (m), and (n)

Group (V): functional groups each capable of forming a covalent bond through the reaction with an azide group of each of the biofunctional molecules
The following (j)

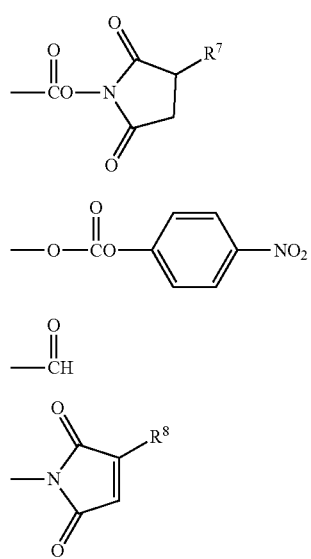

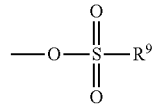

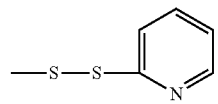

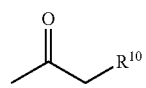

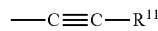

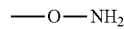

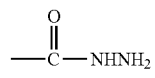

—N₃                                                                        (n)

In the formula, $R^7$ is a hydrogen atom or a sulfo group and, as the sulfo group, sodium sulfonate and potassium sulfonate may be mentioned, but preferred is a hydrogen atom. $R^8$ and $R^{11}$ are a hydrogen atom or a hydrocarbon group having 1 to 5 carbon atoms, and specific hydrocarbon groups include a methyl group, an ethyl group, a propyl group, an isopropyl group, a butyl group, a t-butyl group, a pentyl group, and the like. $R^9$ is a hydrocarbon group having 1 to 10 carbon atoms which may contain a halogen atom, and specific hydrocarbon groups include a methyl group, an ethyl group, a propyl group, an isopropyl group, a butyl group, a t-butyl group, a pentyl group, an isopentyl group, a hexyl group, a benzyl group, a 4-methylphenyl group, a trifluoromethyl group, a 2,2,2-trifluoroethyl group, a 4-(trifluoromethoxy)phenyl group, a vinyl group, a chloroethyl group, a bromoethyl group, an iodoethyl group, and the like, and preferred is a methyl group, a vinyl group, a 4-methylphenyl group, or a 2,2,2-trifluoroethyl group. $R^{10}$ is a halogen atom selected from a chlorine atom, a bromine atom, and an iodine atom.

$X^2$ should be different from $X^1$ and, as preferred combinations of $X^1$ and $X^2$, when $X^1$ is an active ester group or an active carbonate group, $X^2$ is a group selected from a maleimide group, a vinyl sulfone group, an α-haloacetyl group, an alkynyl group, and an azide group; when $X^1$ is an aldehyde group, $X^2$ is a group selected from a maleimide group, a vinyl sulfone group, an alkynyl group, and an azide group; when $X^1$ is a maleimide group, a vinyl sulfone group, or an α-haloacetyl group, $X^2$ is a group selected from an active ester group, an active carbonate group, an alkynyl group, and an azide group; when $X^1$ is an alkynyl group or an azide group, $X^2$ is a group selected from a maleimide group, a vinyl sulfone group, an α-haloacetyl group, an active ester group, an active carbonate group, an amino group, and an oxyamino group; when $X^1$ is an amino group or an oxyamino group, $X^2$ is an alkynyl group, an azide group, a thiol group, or a carboxy group; and when $X^1$ is a thiol group, $X^2$ is a group selected from an amino group, an oxyamino group, an azide group, and a carboxyl group. More preferably, when $X^1$ is an active ester or an active carbonate group, $X^2$ is a group selected from a maleimide group, an α-haloacetyl group, an alkynyl group, and an azide group; when $X^1$ is an aldehyde group, $X^2$ is a group selected from a maleimide group, an α-haloacetyl group, an alkynyl group, and an azide group; when $X^1$ is a maleimide group or an α-haloacetyl group, $X^2$ is a group selected from an active ester group, an active carbonate group, an alkynyl group, and an azide group; when $X^1$ is an alkynyl group or an azide group, $X^2$ is a group selected from a maleimide group, an α-haloacetyl group, an active ester group, an active carbonate group, an amino group, and an oxyamino group; when $X^1$ is an amino group or an oxyamino group, $X^2$ is an alkynyl group, an azide group or a thiol group; and when $X^1$ is a thiol group, $X^2$ is a group selected from an amino group, an oxyamino group, and an azide group.

$Z^3$ is composed of a covalent bond and is not particularly limited as long as it is more stable to acid hydrolysis than the benzylidene acetal linker is, and is preferably an alkylene group alone or an alkylene group having bond(s) selected from an ether bond, an ester bond, a carbonate bond, a urethane bond, an amide bond, and a secondary amino group in the alkylene chain or at the end. The number of the carbon atoms of the alkylene group is preferably from 1 to 24. By way of illustration and without limitation, preferable examples of the alkylene group include structures such as (z1). Preferable examples of the alkylene group having an ether bond include structures such as (z2) or (z3). Preferable examples of the alkylene group having an ester bond include structures such as (z4). Preferable examples of the alkylene group having a carbonate bond include structures such as (z5). Preferable examples of the alkylene group having a urethane bond include structures such as (z6). Preferable examples of the alkylene group having an amide bond include structures such as (z7). Preferable examples of the alkylene group having a secondary amino group include structures such as (z8). In a preferred embodiment, p and q are independently an integer of 1 to 12. For example, in the case where it is intended to bind the functional group $X^2$ in a hydrophobic environment such as the inside of a protein, p and q are preferably large and, in the case where it is intended to bind it in a hydrophilic environment, p and q are preferably small.

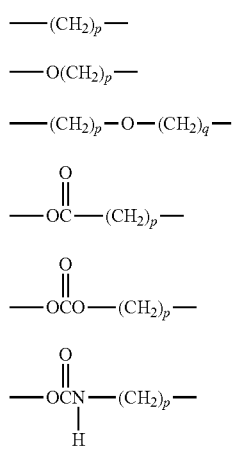

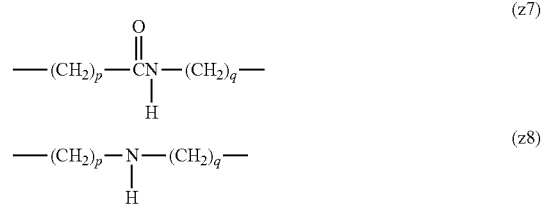

In another aspect of the invention, P in the formula (1) is a branched polyethylene glycol.

In a preferred embodiment of this aspect, P in the formula (1) is represented by the formula (4).

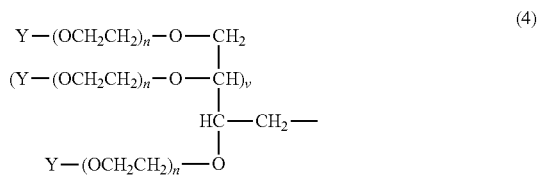

wherein Y is a hydrocarbon group having 1 to 24 carbon atoms as mentioned above and v is 0 or 2.

In the case where v is 0, two polyethylene glycol chains are present and, in the case where v is 2, four polyethylene glycol chains are present. In general, in the chemical modification of a bio-related substance with polyethylene glycol, when binding points to the polyethylene glycol are introduced more than necessary, the active sites of the bio-related substance are destroyed to reduce its function, so that an attempt to increase the effect by increasing the molecular weight of the polyethylene glycol has been performed. However, the viscosity increases with the increase in the molecular weight and hence, for example, handling as an aqueous solution preparation such as an injection preparation becomes difficult. Since the polyethylene glycol derivative has a branched structure, it shows low viscosity as compared with a linear polyethylene glycol derivative having the same molecular and thus is useful in applications such as an aqueous solution preparation.

In another preferred embodiment of this aspect, P in the formula (1) is represented by the formula (5).

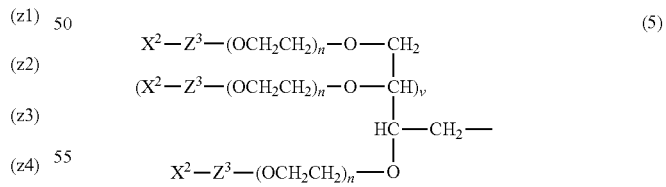

In the formula, $X^2$ is the aforementioned chemically reactive functional group different from $X^1$, $Z^3$ is a divalent spacer as mentioned above, and v is 0 or 2.

The polyethylene glycol derivative has one $X^1$ and two or four $X^2$'s and, for example, when a drug is bound to $X^1$ and a targeting molecule is bound to $X^2$, high target directing performance can be obtained.

In another preferred embodiment of this aspect, P in the formula (1) is represented by the formula (6).

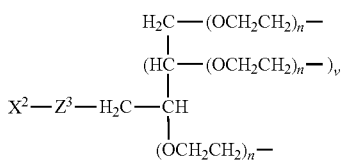

(6)

In the formula, $X^2$ is a chemically reactive functional group different from $X^1$ as mentioned above, $Z^3$ is a divalent spacer as mentioned above, and v is 0 or 2.

In the antibody-drug conjugate (ADC)-related field, in order to increase drug transportation efficiency, it is preferable to bind a plurality of drugs to an antibody but, when a plurality of binding points are introduced into the antibody, a decrease in the affinity to an antigen becomes a problem. The polyethylene glycol derivative has two or four $X^1$'s and one $X^2$, and thus, for example, when an anticancer agent is bind to $X^1$ and an antibody is bound to $X^2$ in ADC where cancer is targeted, it is possible to improve the transportation efficiency of the anticancer agent without increasing the binding points to the antibody.

In another aspect of the invention, P in the formula (1) is a polyethylene glycol having an end number of 2 to 8, all the ends of the polyethylene glycol constituting P are each bound to $Z^2$, and w is equal to the end number of the polyethylene glycol.

In a preferred embodiment of this aspect, P in the formula (1) is selected from the group consisting of the formula (r), the formula (s), the formula (t), the formula (u), and the formula (v). w is 2 in the case where P is represented by the formula (r), w is 3 in the case where P is represented by the formula (s), w is 4 in the case where P is represented by the formula (t), w is 4 in the case where P is represented by the formula (u), and w is 8 in the case where P is represented by the formula (v).

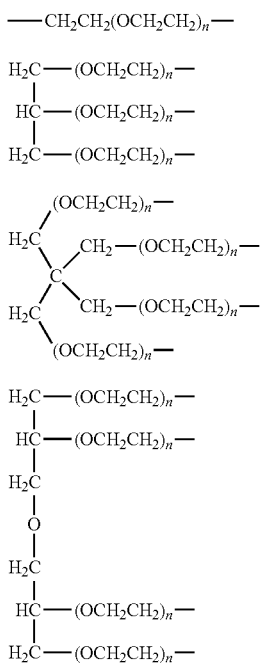

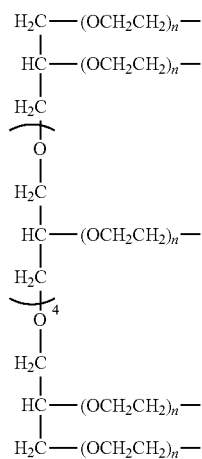

A preferred range of n in the formulae (2) and (3) of the invention is from 3 to 2000, more preferably from 20 to 1500, more preferably from 40 to 1000, and most preferably from 60 to 500. Furthermore, a preferred range of n in the formula (4), the formula (5), and the formula (6) is from 3 to 1,000, preferably from 10 to 800, more preferably from 20 to 500, and most preferably from 30 to 300.

The hydrophilic polymer derivative having a benzylidene acetal linker of the invention can be synthesized by the coupling reaction of a linker unit, into which a benzylidene acetal group having substituent(s) is introduced, with a hydrophilic polymer precursor. The bond generated by the coupling reaction is determined by a combination of the functional groups used in the reaction, and is the ether bond, the ester bond, the carbonate bond, the urethane bond, the amide bond, or the secondary amino group contained in the above divalent spacer $Z^2$. In the synthesized hydrophilic polymer derivative, the end functional group of the benzylidene acetal linker is chemically converted as required. As the reaction used for the functional group conversion, a conventionally known method can be used but, conditions that do not decompose the benzylidene acetal group of the formula (1) and the bonds contained in the above divalent spacers $Z^2$ and $Z^1$ should be properly selected.

As a typical example of the coupling reaction of the benzylidene acetal linker unit with the hydrophilic polymer precursor and the further chemical conversion of the end functional group, the following steps may be mentioned. Here, polyethylene glycol that is a typical hydrophilic polymer will be described as an example.

(A) Synthesis of Benzylidene Acetal Linker Unit

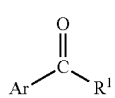

(13)

wherein Ar is a benzene ring having substituent(s) and $R^1$ is a hydrogen atom or a hydrocarbon group.

A 3-aminopropanol derivative whose amino group is protected with a phthalimide group that is a typical protective group is allowed to react with a carbonyl compound of the formula (13) in an aprotic solvent such as toluene, benzene, xylene, acetonitrile, ethyl acetate, diethyl ether, t-butyl methyl ether, tetrahydrofuran, chloroform, dichloromethane, dimethyl sulfoxide, dimethylformamide, or dimethylacetamide or without any solvent in the presence of an acid catalyst to obtain a compound of the following formula (14) having a benzylidene acetal group. The resulting compound may be purified by extraction, recrystallization, adsorbent treatment, column chromatography, or the like. Instead of the carbonyl compound, it is possible to use a corresponding acetal derivative of a lower alcohol. The lower alcohol is preferably an alcohol having 1 to 5 carbon atoms, and more preferably methanol or ethanol. The acid catalyst may be either an organic acid or an inorganic acid and is not particularly limited but specific examples thereof include p-toluenesulfonic acid, pyridinium p-toluenesulfonate, methanesulfonic acid, 10-camphorsulfonic acid, hydrogen chloride, iodine, ammonium chloride, oxalic acid, boron trifluoride-diethyl ether complex, and the like.

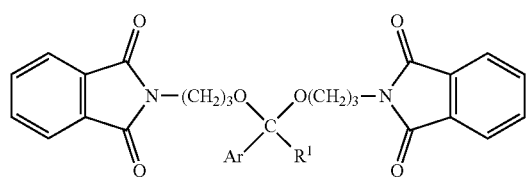
(14)

Here, the "protective group" is a component that prevents or blocks a reaction of a particular reactive functional group in a molecule under certain reaction conditions. The protective group varies depending on the type of the reactive functional group to be protected, the conditions to be used, and the presence of the other functional group or protective group in the molecule. Specific examples of the protective group can be found in many general books and are described in, for example, "Wuts, P. G. M.; Greene, T. W. Protective Groups in Organic Synthesis, 4th ed.; Wiley-Interscience: New York, 2007".

As the protective group in the compound of the formula (14), other protective groups may be used as long as they are stable in the acidic conditions of the acetalization reaction and can be deprotected by a method other than the catalytic reduction by which the benzylidene acetal group is decomposed. When the reactive functional group is an amino group, for example, acyl-based protective groups and carbamate-based protective groups may be mentioned and specifically, a trifluoroacetyl group, a 9-fluorenylmethyloxycarbonyl group, a 2-(trimethylsilyl)ethyloxycarbonyl group, and the like may be mentioned. Furthermore, when the reactive functional group is a hydroxy group, for example, silyl-based protective groups and acyl-based protective groups may be mentioned and specifically, a t-butyldiphenylsilyl group, a t-butyldimethylsilyl group, a triisopropylsilyl group, an acetyl group, a pivaloyl group, and the like may be mentioned.

Then, after the compound of the formula (14) is treated with hydrazine monohydrate that is a deprotecting reagent to deprotect two phthalimide groups, ethyl trifluoroacetate that is a protective reagent is reacted in an amount of 1 molar equivalent to obtain a compound of the formula (15), in which only one of the amino groups is protected with a trifluoroacetyl group. Alternatively, by adjusting the amount of the deprotecting reagent for the compound of the formula (14), it is also possible to obtain a compound analogous to the formula (15), in which only one of the amino groups is protected with a phthalimide group. The obtained compound may be purified by the aforementioned purification methods.

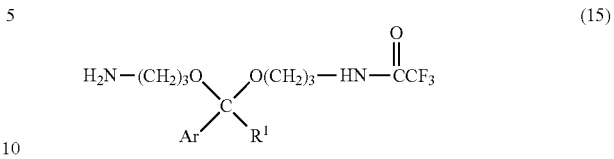
(15)

As the protective group in the compound of the formula (15), other protecting groups may also be used as long as it is possible to deprotect them by any method other than acidic conditions under which the benzylidene acetal group is decomposed and catalytic reduction, as well as conditions which decompose the bond generated by the coupling reaction of the benzylidene acetal linker unit with the hydrophilic polymer precursor. When the reactive functional group is an amino group, for example, acyl-based protective groups and carbamate-based protective groups may be mentioned and specifically, a phthalimide group, a 9-fluorenylmethyloxycarbonyl group, a 2-(trimethylsilyl)ethyloxycarbonyl group, and the like may be mentioned. Furthermore, when the reactive functional group is a hydroxy group, for example, silyl protective groups and acyl-based protective groups may be mentioned and specifically, a t-butyldiphenylsilyl group, a t-butyldimethylsilyl group, a triisopropylsilyl group, an acetyl group, a pivaloyl group, and the like may be mentioned. Typical deprotection conditions for the protective groups are described in the aforementioned literature and it is possible to select a method suitable for each of the protective groups.

(B) Synthesis of Polyethylene Glycol Precursor

Ethylene oxide is polymerized in an amount of 3 to 2000 molar equivalents to methanol that is an initiator in toluene or with no solvent under alkaline conditions such as metallic sodium, metallic potassium, sodium hydride, or potassium hydride to obtain a polyethylene glycol of the formula (16). The initiator is preferably an alcohol having a hydrocarbon group having 1 to 24 carbon atoms, and specifically methanol, ethanol, propanol, isopropanol, butanol, t-butanol, phenol, benzyl alcohol, and the like may be mentioned.

$$CH_3-(OCH_2CH_2)_n-OH \qquad (16)$$

The polyethylene glycol of the formula (16) is allowed to react with N,N'-disuccinimidyl carbonate in an aprotic solvent such as toluene, benzene, xylene, acetonitrile, ethyl acetate, diethyl ether, t-butyl methyl ether, tetrahydrofuran, chloroform, dichloromethane, dimethyl sulfoxide, dimethylformamide or dimethylacetamide or with no solvent in the presence of an organic base such as triethylamine, N-methylmorpholine, pyridine, or 4-dimethylaminopyridine or an inorganic base such as sodium carbonate, sodium hydrogen carbonate, sodium acetate, or potassium carbonate to obtain a polyethylene glycol precursor of the formula (17). The above organic bases and inorganic bases may not be used. The use ratio of the organic bases or the inorganic base is not particularly limited but is preferably equimolar or more to the hydroxyl group of the polyethylene glycol of the formula (16). Also, it is possible to use an organic base as a solvent. The obtained compound may be purified by a purification method such as extraction, recrystallization, adsorbent treatment, reprecipitation, column chromatography, or supercritical extraction.

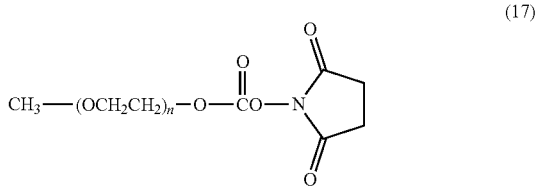

(17)

As the reactive functional group in the polyethylene glycol precursor of the formula (17), other reactive functional groups can be also used. Preferred examples of the reactive functional groups are functional groups where the bond generated by the coupling reaction of the polyethylene glycol precursor with the above benzylidene acetal linker unit becomes the ether bond, the ester bond, the carbonate bond, the urethane bond, the amide bond, or the secondary amino group contained in the divalent spacer $Z^2$ of the formula (1), and specifically, an active ester, an active carbonate, an aldehyde group, a sulfonyloxy group, an amino group, and the like may be mentioned.

(C) Coupling Reaction of Benzylidene Acetal Linker Unit with Polyethylene Glycol Precursor The benzylidene acetal linker unit of the formula (15) and the polyethylene glycol precursor of the formula (17) are subjected to a coupling reaction in an aprotic solvent such as toluene, benzene, xylene, acetonitrile, ethyl acetate, diethyl ether, t-butyl methyl ether, tetrahydrofuran, chloroform, dichloromethane, dimethyl sulfoxide, dimethylformamide, or dimethylacetamide or with no solvent in the presence of an organic base such as triethylamine, N-methylmorpholine, pyridine, or 4-dimethylaminopyridine or an inorganic base such as sodium carbonate, sodium hydrogen carbonate, sodium acetate, or potassium carbonate to obtain a compound of the formula (18). The above organic bases and inorganic bases may not be used. The use ratio of the organic base or the inorganic base is not particularly limited but is preferably equimolar or more to the reactive functional group of the polyethylene glycol precursor of the formula (17). Also, it is possible to use an organic base as a solvent. The obtained compound may be purified by the aforementioned purification means.

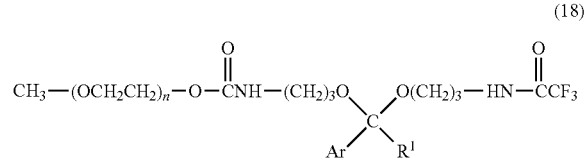

(18)

The reaction conditions for the coupling reaction are determined depending on the combination of the reactive functional group of the benzylidene acetal linker unit and the reactive functional group of the polyethylene glycol precursor and a conventionally known method may be used. However, it is necessary to select conditions that do not decompose the bonds contained in the benzylidene acetal group of the formula (1) and the above divalent spacers $Z^2$ and $Z^1$.

(D) Conversion of End Functional Group of Polyethylene Glycol Derivative Having Benzylidene Acetal Linker The compound of the formula (18) is treated with a base such as sodium carbonate, sodium hydroxide, potassium carbonate, potassium hydroxide, lithium hydroxide, or ammonia in a protic solvent such as water, methanol, or ethanol or in an aprotic solvent containing them to obtain a compound of the formula (19) in which the trifluoroacetyl group is removed and converted into an amino group. The obtained compound may be purified by the aforementioned purification means.

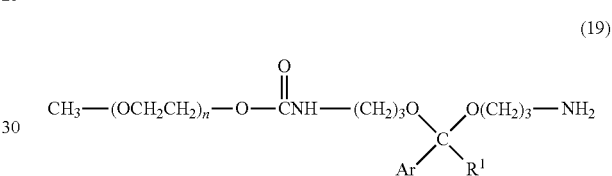

(19)

Furthermore, the compound of formula (19) is allowed to react with N-succinimidyl 3-maleimidopropionate in an aprotic solvent such as toluene, benzene, xylene, acetonitrile, ethyl acetate, diethyl ether, t-butyl methyl ether, tetrahydrofuran, chloroform, dichloromethane, dimethyl sulfoxide, dimethylformamide, or dimethylacetamide or with no solvent in the presence of an organic base such as triethylamine, N-methylmorpholine, pyridine, or 4-dimethylaminopyridine or an inorganic base such as sodium carbonate, sodium hydrogen carbonate, sodium acetate, or potassium carbonate to obtain a formula (20) in which a maleimide group is introduced into the end. The organic bases and inorganic bases may not be used. The use ratio of the organic base or the inorganic base is not particularly limited but is preferably equimolar or more to the reactive functional group of the compound of the formula (19). Also, it is possible to use an organic base as a solvent. The obtained compound may be purified by the aforementioned purification means.

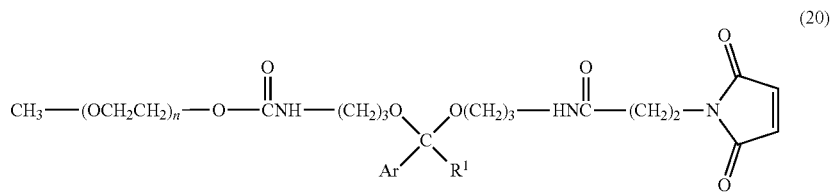

(20)

EXAMPLES

The present invention will be further specifically described with reference to Examples but the invention should not be construed as being limited thereto.

In $^1$H-NMR analysis, JNM-ECP400 or JNM-ECA600 manufactured by JEOL Ltd. DATUM was used. For the measurement, a tube of 5 mmφ was used and tetramethylsilane (TMS) was used as an internal standard substance in the case where a deuterated solvent was CDCl$_3$, CD$_3$CN, or CD$_3$OD or HDO is used as a standard in the case of D$_2$O.

In gel permeation chromatography (GPC) analysis, there were used SHODEX GPC SYSTEM-11 as a GPC system, SHODEX RIX8 as a differential refractometer that is a detector, and three columns, i.e., SHODEX KF801L, KF803L, and KF804L (φ8 mm×300 mm) as GPC columns connected in series, and the temperature of the column oven was controlled to 40° C. Measurement was performed while tetrahydrofuran was used as an eluent, the flow rate was controlled to 1 ml/min, the concentration of a sample is controlled to 0.1 wt %, and the injection volume was controlled to 0.1 mL. As a calibration curve, there was used one created using ethylene glycol, diethylene glycol, and triethylene glycol manufactured by Kanto Chemical Co., Ltd. and Polymer Standards for GPC of polyethylene glycol or polyethylene oxide having a molecular weight of 600 to 70,000 manufactured by Polymer Laboratory. For analysis of data, BORWIN GPC calculation program was used. Mn represents number-average molecular weight, Mw represents weight-average molecular weight, and for molecular weight distribution, as Mw/Mn, calculated values thereof were shown.

A deuterated water buffer of MES (2-morpholinoethanesulfonic acid) having pD 5.5 and a deuterated water buffer of HEPES (2-[4-(Hydroxyethyl)-1-piperazinyl]ethanesulfonic acid) having pD 7.4 for use in hydrolysis tests were prepared by adding a 0.1M sodium hydroxide deuterated water solution to a 0.1M MES deuterated water solution and a 0.1M HEPES deuterated water solution, respectively, based on the following relational equation described in [Glasoe, P. K.; Long, F. A. J. Phys. Chem. 1960, 64, 188-190].

$pD$=Measured value on $pH$ meter+0.40

A hydrolysis ratio was evaluated by $^1$H-NMR and, in the case of the compounds of the formula (26), the formula (29) and the formula (30), the ratio was calculated according to the following calculation equation while an integrated value of the hydrogen of the acetal group was taken as $I^1$, an integral value of the hydrogen of the aldehyde group to be formed by hydrolysis was taken as $I^2$.

Hydrolysis ratio (%)=[$I^2$/($I^1$+$I^2$)]×100

In the case of the compound of the formula (31), when an integrated value of the benzene ring bonded to the acetal group was taken as $I^3$ and an integral value of the benzene ring of acetophenone formed by hydrolysis was taken as $I^4$, the ratio was calculated according to the following equation.

Hydrolysis ratio (%)=[$I^4$/($I^3$+$I^4$)]×100

Example 1

Into a 300 mL four-necked flask equipped with a thermometer, a nitrogen inlet tube, a stirrer, a Dean-stark tube, and a condenser tube were charged 2-bromo-benzaldehyde dimethyl acetal (2.31 g, 10.0 mmol), N-(3-hydroxypropyl) phthalimide (8.21 g, 40.0 mmol), and toluene (120 g), and water was removed as an azeotrope with toluene. After cooling to room temperature, pyridinium p-toluenesulfonate (0.25 g, 1.0 mmol) was added and reaction was carried out for three hours while methanol formed as a by-product was removed as an azeotrope with toluene. After quenching with triethylamine (10 mL), the whole was diluted with a mixed solution of ethyl acetate (100 mL) and hexane (100 mL). After sequential washing with a saturated aqueous sodium hydrogen carbonate solution (100 mL) and saturated brine (100 mL), the organic layer was dried over anhydrous sodium sulfate. After filtration, the solvent was removed by distillation under reduced pressure and the residue was purified by recrystallization to obtain a compound of the formula (21). $^1$H-NMR (CDCl$_3$, internal standard TMS); δ (ppm): 1.92-2.01 (4H, m, —CH$_2$CH$_2$CH$_2$O—), 3.53-3.67 (4H, m, —CH$_2$CH$_2$CH$_2$O—), 3.75-3.81(4H, m, —CH$_2$CH$_2$CH$_2$O—), 5.64(1H, s, >CH—), 7.08-7.49 (4H, m, arom. H), 7.64-7.81(8H, m, arom. H)

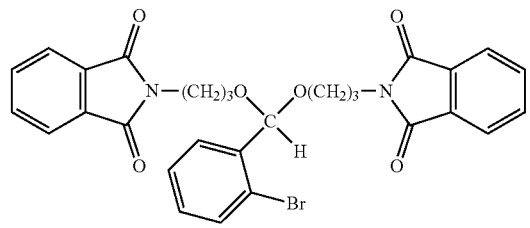

(21)

Example 2

Into a 100 mL three-necked flask equipped with a thermometer, a nitrogen inlet tube, and a stirrer were charged the compound of the formula (21) (1.00 g, 1.73 mmol), ethanol (36 mL), and hydrazine monohydrate (0.84 mL), and reaction was carried out at 60° C. for 6 hours. After cooling to room temperature and filtration, the filtrate was diluted with dichloromethane (108 mL). After washing with 10% brine (80 mL), the organic layer was dried over anhydrous sodium sulfate. After filtration, the solvent was removed by distillation under reduced pressure to obtain a compound of the formula (22).

$^1$H-NMR (CD$_3$OD, internal standard TMS); δ (ppm): 1.73-1.78(4H, m, —CH$_2$CH$_2$CH$_2$O—), 2.74(4H, t, —CH$_2$CH$_2$CH$_2$O—), 3.57-3.70(4H, m, —CH$_2$CH$_2$CH$_2$O—), 5.67(1H, s, >CH—), 7.23-7.61(4H, m, arom. H)

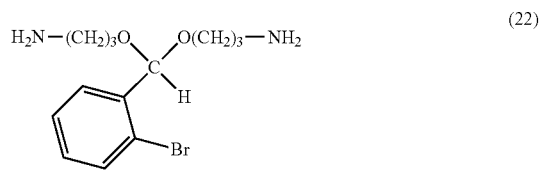

(22)

Example 3

Into a 100 mL three-necked flask equipped with a thermometer, a nitrogen inlet tube, and a stirrer were charged the compound of the formula (22) (0.30 g, 0.95 mmol) and dry methanol (18 mL), and the whole was stirred while a solution obtained by dissolving ethyl trifluoroacetate (0.13 g, 0.95 mmol) into dry methanol (18 mL) was added dropwise. After dropwise addition, reaction was carried out at 25° C. for 2 hours. The solvent was removed by distillation under reduced pressure and the residue was diluted with t-butyl methyl ether (18 mL). After washing with ion-exchange water (18 mL), the organic layer was dried over anhydrous sodium sulfate. After filtration, the solvent was removed by distillation under reduced pressure to obtain a compound of the formula (23) as a mixture with a compound (contained in a ratio of 40 wt %) in which the amino groups at both ends were protected with a trifluoroacetyl group.

$^1$H-NMR (CD$_3$OD, internal standard TMS); δ (ppm): 1.73-1.78(2H, m, NH$_2$CH$_2$CH$_2$CH$_2$O—), 1.83-1.88(2H, m, CF$_3$CONHCH$_2$CH$_2$CH$_2$O—), 2.74(2H, t, NH$_2$CH$_2$CH$_2$CH$_2$O—), 3.40(2H, t, CF$_3$CONHCH$_2$CH$_2$CH$_2$O—), 3.54-3.70(4H, m, —CH$_2$CH$_2$CH$_2$O—), 5.68(1H, s, >CH—), 7.23-7.63(4H, m, arom. H)

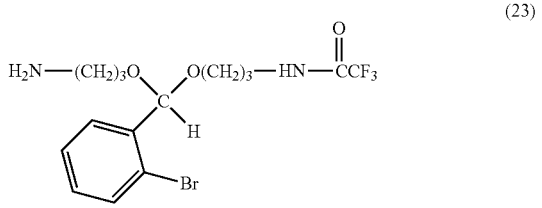

(23)

Example 4

Into a 300 mL four-necked flask equipped with a thermometer, a nitrogen inlet tube, and a stirrer were charged dry methanol (12.8 g, 0.400 mol), dry toluene (150 g), and metal sodium (0.3 g, 13 mmol), and the whole was stirred until the metal sodium was dissolved while nitrogen was introduced with bubbling. The solution was charged into a 5 L autoclave and, after the inside of the system was substituted with nitrogen, temperature was raised to 100° C. After ethylene oxide gas (1,987 g, 45 mol) was added at 100 to 130° C. under a pressure of 1 MPa or less, the reaction was continued for another 2 hours. After an unreacted ethylene oxide gas was removed under reduced pressure, the whole was cooled to 60° C. and pH was adjusted to 7.5 with an aqueous 85% phosphoric acid solution to obtain a compound of the formula (24).

$^1$H-NMR (CDCl$_3$, internal standard TMS); δ (ppm): 2.68 (1H, t, OH), 3.38(3H, s, CH$_3$O—), 3.49-3.85(450H, m, —(OCH$_2$CH$_2$)$_n$—)

GPC analysis; number-average molecular weight (Mn): 5119, weight-average molecular weight (Mw): 5226, polydispersity (Mw/Mn): 1.021

CH$_3$—(OCH$_2$CH$_2$)$_n$—OH (24)

n=about 113

Example 5

Into a 100 mL three-necked flask equipped with a thermometer, a nitrogen inlet tube, a stirrer, a Dean-stark tube, and a condenser tube were charged the compound of the formula (24) (10.0 g, 2.00 mmol) and toluene (40 g), and water was removed as an azeotrope with toluene. After cooling to 40° C., pyridine (0.71 g, 9.00 mmol) and N,N'-disuccinimidyl carbonate (1.54 g, 6.00 mmol) was charged and reaction was carried out at 80° C. for 7 hours. After filtration, the whole was diluted with ethyl acetate (45 g) and crystallization was performed by adding hexane (16 g). After filtration, crystals were dissolved into ethyl acetate (76 g) and crystallization was again performed by adding hexane (24 g). After filtration, crystals were dried under reduced pressure to obtain a compound of the formula (25).

$^1$H-NMR (CDCl$_3$, internal standard TMS); δ (ppm): 2.84 (4H, s, succinimide), 3.38(3H, s, CH$_3$O—), 3.48-3.85(448H, m, —(OCH$_2$CH$_2$)$_n$—OCH$_2$—), 4.44-4.48(2H, m, —CH$_2$O—COO-succinimide)

GPC analysis; number-average molecular weight (Mn): 5129, weight-average molecular weight (Mw): 5247, polydispersity (Mw/Mn): 1.023.

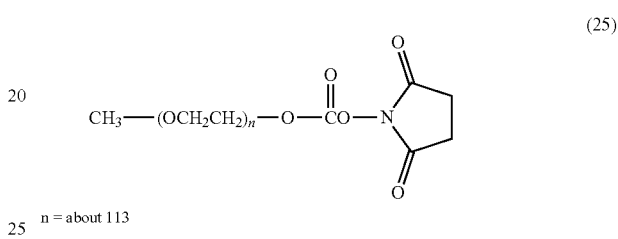

(25)

n = about 113

Example 6

Into a 100 mL three-necked flask equipped with a thermometer, a nitrogen inlet tube, and a stirrer were charged the compound of the formula (25) (1.0 g, 0.20 mmol) and dry dichloromethane (36 g), and the whole was stirred while a dry dichloromethane (4 g) solution of the compound of the formula (23) (purity: 60 wt %) (206 mg, 0.30 mmol) and N,N-diisopropylethylamine (38 mg, 0.30 mmol) was added dropwise. After completion of the dropwise addition, reaction was carried out at 25° C. for 3 hours. The solvent was removed by distillation under reduced pressure, the residue was dissolved in ethyl acetate (25 g), and then crystallization was performed by adding hexane (25 g). After filtration, drying was performed under reduced pressure to obtain a compound of the formula (26).

$^1$H-NMR (CDCl$_3$, internal standard TMS); δ (ppm): 1.78-1.93(4H, m, —CH$_2$CH$_2$CH$_2$O—), 3.26-3.37(2H, m, —OCONHCH$_2$CH$_2$CH$_2$O—), 3.38(3H, s, CH$_3$O—), 3.47-3.81 (454H, m, CF$_3$CONHCH$_2$CH$_2$CH$_2$O—, —CH$_2$CH$_2$CH$_2$O—, —(OCH$_2$CH$_2$)$_n$—OCH$_2$—), 4.20(2H, t, —OCH$_2$CH$_2$OCONH—), 5.11(1H, brs, —OCONH—), 5.67(1H, s, >CH—), 7.21-7.59(4H, m, arom. H), 7.31(1H, brs, CF$_3$CONH—)

GPC analysis; number-average molecular weight (Mn): 5424, weight-average molecular weight (Mw): 5549, polydispersity (Mw/Mn): 1.023.

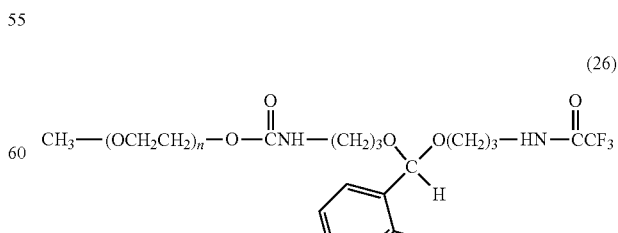

(26)

n = about 113

Example 7

Into a 50 mL three-necked flask equipped with a thermometer, a nitrogen inlet tube, and a stirrer were charged the compound of the formula (26) (0.50 g, 0.10 mmol) and a 1M aqueous potassium carbonate solution (15 g), and reaction was carried out at 25° C. for 3 hours. Extraction was performed with dichloromethane (15 g) and, after the solvent was removed by distillation under reduced pressure, the residue was dissolved in ethyl acetate (25 g) and dried over anhydrous sodium sulfate. After filtration, crystallization was performed by adding hexane (25 g). After filtration, drying was performed under reduced pressure to obtain a compound of the formula (27).

$^1$H-NMR (CD$_3$CN, internal standard TMS); δ (ppm): 1.62-1.68(2H, m, NH$_2$CH$_2$CH$_2$CH$_2$O—), 1.71-1.77(2H, m, —OCONHCH$_2$CH$_2$CH$_2$O—), 2.67-2.71(2H, m, NH$_2$CH$_2$CH$_2$CH$_2$O—), 3.15-3.20(2H, m, —OCONHCH$_2$CH$_2$CH$_2$O—), 3.29(3H, s, CH$_3$O—), 3.41-3.69 (452H, m, —CH$_2$CH$_2$CH$_2$O—, —(OCH$_2$CH$_2$)$_n$—OCH$_2$—), 4.08(2H, t, —OCH$_2$CH$_2$OCONH—), 5.62(1H, s, >CH—), 5.73(1H, brs, —OCONH—), 7.24-7.63(4H, m, arom. H)

GPC analysis; number-average molecular weight (Mn): 5408, weight-average molecular weight (Mw): 5532, polydispersity (Mw/Mn): 1.023.

(27)

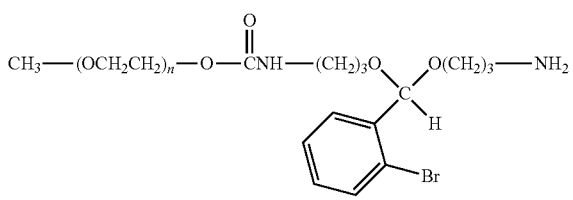

n = about 113

Example 8

Into a 50 mL three-necked flask equipped with a thermometer, a nitrogen inlet tube, and a stirrer were charged the compound of the formula (27) (0.20 g, 0.040 mmol) and acetonitrile (10 g), and N-succinimidyl 3-maleimidopropionate (32 mg, 0.048 mmol) was added thereto and reaction was carried out at 25° C. for 3 hours. After filtration, the solvent was removed by distillation under reduced pressure. The residue was dissolved in ethyl acetate (25 g) and then crystallization was performed by adding hexane (25 g). After filtration, drying was performed under reduced pressure to obtain a compound of the formula (28).

$^1$H-NMR (CDCl$_3$, internal standard TMS); δ (ppm): 1.78-1.83(4H, m, —CONHCH$_2$CH$_2$CH$_2$O—), 2.44(2H, t, —CH$_2$CH$_2$-maleimide), 3.27-3.37(4H, m, —CONHCH$_2$CH$_2$CH$_2$O—), 3.38(3H, s, CH$_3$O—), 3.47-3.83(454H, m, —CH$_2$CH$_2$CH$_2$O—, —(OCH$_2$CH$_2$)$_n$—OCH$_2$—, —CH$_2$CH$_2$-maleimide), 4.20(2H, t, —OCH$_2$CH$_2$OCONH—), 5.18(1H, brs, —OCONH—), 5.65(1H, s, >CH—), 6.15(1H, brs, —NHCO—), 6.70(2H, s, maleimide), 7.20-7.60(4H, m, arom. H)

GPC analysis; number-average molecular weight (Mn): 5561, weight-average molecular weight (Mw): 5694, polydispersity (Mw/Mn): 1.024.

(28)

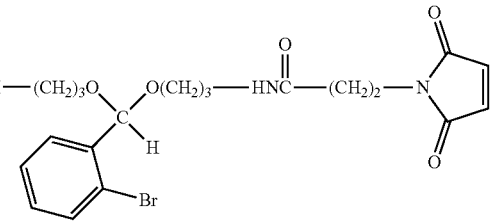

n = about 113

Example 9

A compound of the formula (29) was obtained in the same manner as in Examples 1 to 6 using 2-nitro-benzaldehyde dimethyl acetal.

$^1$H-NMR (CDCl$_3$, internal standard TMS); δ (ppm): 1.83-1.91(4H, m, —CH$_2$CH$_2$CH$_2$O—), 3.26-3.36(2H, m, —OCONHCH$_2$CH$_2$CH$_2$O—), 3.38(3H, s, CH$_3$O—), 3.47-3.85(454H, m, CF$_3$CONHCH$_2$CH$_2$CH$_2$O—, —CH$_2$CH$_2$CH$_2$O—, —(OCH$_2$CH$_2$)$_n$—OCH$_2$—), 4.21(2H, t, —OCH$_2$CH$_2$OCONH—), 5.10(1H, brs, —OCONH—), 6.00(1H, s, >CH—), 7.50-7.86(4H, m, arom. H), 7.27(1H, brs, CF$_3$CONH—)

GPC analysis; number-average molecular weight (Mn): 5391, weight-average molecular weight (Mw): 5510, polydispersity (Mw/Mn): 1.022.

(29)

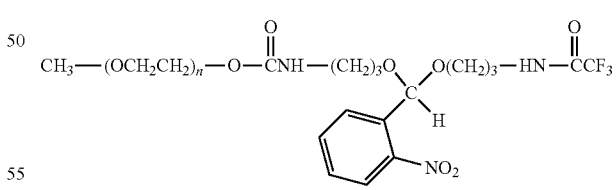

n = about 113

Example 10

A compound of the formula (30) was obtained in the same manner as in Examples 1 to 6 using 4-nitro-benzaldehyde dimethyl acetal.

$^1$H-NMR (CDCl$_3$, internal standard TMS); δ (ppm): 1.80-1.93(4H, m, —CH$_2$CH$_2$CH$_2$O—), 3.31-3.34(2H, m, —OCONHCH$_2$CH$_2$CH$_2$O—), 3.38(3H, s, CH$_3$O—), 3.47-

3.81(454H, m, CF₃CONHCH₂CH₂CH₂O—, —CH₂CH₂CH₂O—, —(OCH₂CH₂)ₙ—OCH₂—), 4.20(2H, t, —OCH₂CH₂OCONH—), 5.09(1H, brs, —OCONH—), 5.56(1H, s, >CH—), 7.27(1H, brs, CF₃CONH—), 7.62(2H, d, arom. H), 8.24(2H, d, arom. H)

GPC analysis; number-average molecular weight (Mn): 5375, weight-average molecular weight (Mw): 5488, polydispersity (Mw/Mn): 1.021.

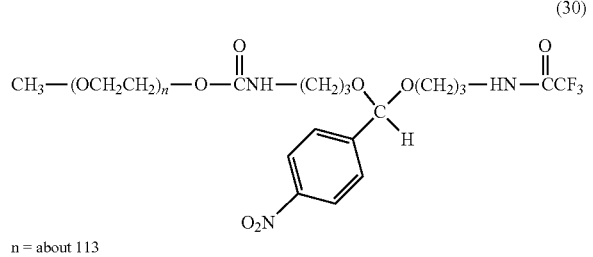

(30)

CH₃—(OCH₂CH₂)ₙ—O—CNH—(CH₂)₃O  O(CH₂)₃—HN—CCF₃

O₂N n = about 113

Example 11

A compound of the formula (31) was obtained in the same manner as in Examples 1 to 6 using 2'-nitroacetophenone dimethyl acetal.

¹H-NMR (CDCl₃, internal standard TMS); δ (ppm): 1.74-1.88(7H, m, CH₃—, —CH₂CH₂CH₂O—), 3.21-3.33(2H, m, —OCONHCH₂CH₂CH₂O—), 3.38(3H, s, CH₃O—), 3.41-3.81(454H, m, CF₃CONHCH₂CH₂CH₂O—, —CH₂CH₂CH₂O—, —(OCH₂CH₂)ₙ—OCH₂—), 4.21(2H, t, —OCH₂CH₂OCONH—), 5.06(1H, brs, —OCONH—), 7.27(1H, brs, CF₃CONH—), 7.42-7.55(4H, m, arom. H)

GPC analysis; number-average molecular weight (Mn): 5402, weight-average molecular weight (Mw): 5521, polydispersity (Mw/Mn): 1.022.

(31)

CH₃—(OCH₂CH₂)ₙ—O—CNH—(CH₂)₃O  O(CH₂)₃—HN—CCF₃

CH₃

NO₂ n = about 113

Example 12

(32)

NH₂(CH₂)₂—(OCH₂CH₂)ₙ—O—C(CH₃)₃ n = about 113

A compound of the formula (33) was obtained by removing the t-butyl group from the compound of the formula (32) synthesized by the method described in JP-A-2010-248504 using hydrochloric acid.

¹H-NMR (D₂O, internal standard TMS); δ (ppm): 3.14 (2H, t, NH₂CH₂—), 3.40-4.00(452H, m, —(OCH₂CH₂)ₙ—OCH₂—)

NH₂(CH₂)₂—(OCH₂CH₂)ₙ—OH   (33)

n=about 113

Example 13

A compound of the formula (34) was obtained by reacting the compound of the formula (33) with 5-azidopentanoic anhydride.

¹H-NMR (CDCl₃, internal standard TMS); δ (ppm): 1.60-1.74(4H, m, —CH₂CH₂CH₂CH₂N₃), 2.18(2H, t, —CH₂CH₂CH₂CH₂N₃), 3.29(2H, t, —CH₂CH₂CH₂CH₂N₃), 3.40-3.85(454H, m, —(OCH₂CH₂)ₙ—OCH₂—, —CONHCH₂—), 6.30(1H, brs, —CONH—)

(34)

N₃—(CH₂)₄C—NH(CH₂)₂—(OCH₂CH₂)ₙ—OH n = about 113

Example 14

A compound of the formula (35) was obtained by reacting the compound of the formula (34) with N,N'-disuccinimidyl carbonate in dichloromethane in the presence of triethylamine.

¹H-NMR (CDCl₃, internal standard TMS); δ (ppm): 1.60-1.74(4H, m, —CH₂CH₂CH₂CH₂N₃), 2.18(2H, t, —CH₂CH₂CH₂CH₂N₃), 2.84(4H, s, succinimide), 3.29(2H, t, —CH₂CH₂CH₂CH₂N₃), 3.40-3.85(452H, m, —(OCH₂CH₂)ₙ—OCH₂—, —CONHCH₂—), 4.44-4.48 (2H, m, —CH₂O—COO-succinimide), 6.30(1H, brs, —CH₂CONH—)

(35)

N₃—(CH₂)₄C—NH(CH₂)₂—(OCH₂CH₂)ₙ—O—CO—N(succinimide)

n = about 113

Example 15

A compound of the formula (36) was obtained by reacting the compound of the formula (35) with the compound of the formula (23) in the same manner as in Example 6.

¹H-NMR (CDCl₃, internal standard TMS); δ (ppm): 1.60-1.93(8H, m, —CH₂CH₂CH₂CH₂N₃, —CH₂CH₂CH₂O—), 2.18(2H, t, —CH₂CH₂CH₂CH₂N₃), 3.26-3.37(4H, m, —OCONHCH₂CH₂CH₂O—, —CH₂CH₂CH₂N₃), 3.40-3.85(458H, m, —(OCH₂CH₂)ₙ—OCH₂—, —CH₂CONHCH₂—, CF₃CONHCH₂CH₂CH₂O—, —CH₂CH₂CH₂O—), 4.20(2H, t, —OCH₂CH₂OCONH—), 5.11(1H, brs, —OCONH—), 5.67(1H, s, >CH—), 6.30(1H, brs, —CH₂CONH—), 7.21-7.59(4H, m, arom. H), 7.31(1H, brs, CF₃CONH—)

m, —(OCH₂CH₂)$_n$—OCH₂—, —(OCH₂CH₂)$_n$—OCH<), 4.39(1H, dd, —CH₂O—COO-succinimide), 4.49(1H, dd, —CH₂O—COO-succinimide)

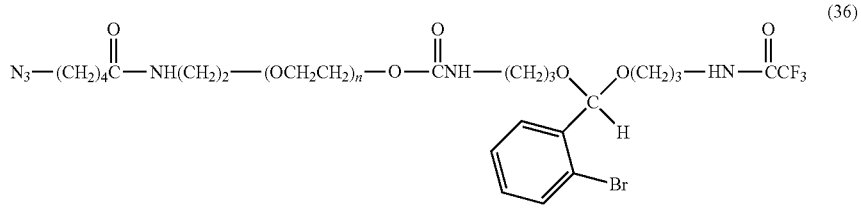

(36)

n = about 113

Example 16

A compound of the formula (37) was obtained by removing the trifluoroacetyl group from the compound of the formula (36) in the same manner as in Example 7, followed by reaction with iodoacetic anhydride.

¹H-NMR (CDCl₃, internal standard TMS); δ (ppm): 1.60-1.93(8H, m, —CH₂CH₂CH₂CH₂N₃, —CH₂CH₂CH₂O—), 2.18 (2H, t, —CH₂CH₂CH₂CH₂N₃), 3.26-3.37(6H, m, —OCONHCH₂CH₂CH₂O—, —CH₂CH₂CH₂CH₂N₃, ICH₂CONHCH₂—), 3.40-3.85(458H, m, —(OCH₂CH₂)$_n$—OCH₂—, —CH₂CH₂CONHCH₂—, —CH₂CH₂CH₂O—, ICH₂CONHCH₂—), 4.20(2H, t, —OCH₂CH₂OCONH—), 5.11(1H, brs, —OCONH—), 5.67(1H, s, >CH—), 6.30(1H, brs, —CH₂CH₂CONH—), 6.96(1H, brs, ICH₂CONHCH₂—), 7.21-7.59(4H, m, arom. H)

GPC analysis; number-average molecular weight (Mn): 5764, weight-average molecular weight (Mw): 5890, polydispersity (Mw/Mn): 1.024.

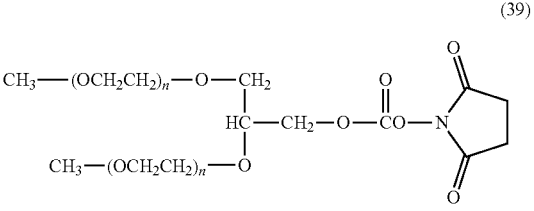

(39)

n = about 113

Example 18

A compound of the formula (40) was obtained by reacting the compound of the formula (39) with the compound of the formula (23) in the same manner as in Example 6.

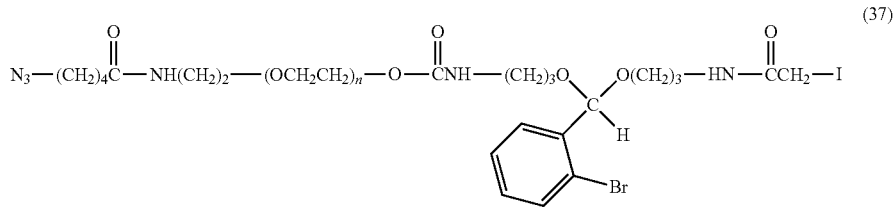

(37)

n = about 113

Example 17

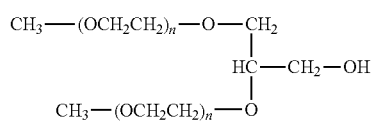

(38)

n = about 113

A compound of the formula (39) was obtained by reacting the compound of the formula (38) synthesized by the method described in JP-A-2004-197077 with N,N'-disuccinimidyl carbonate in the same manner as in Example 5.

¹H-NMR (CDCl₃, internal standard TMS); δ (ppm): 2.84 (4H, s, succinimide), 3.38(6H, s, CH₃O—), 3.40-4.00(903H, ¹H-NMR (CDCl₃, internal standard TMS); δ (ppm): 1.78-1.93(4H, m, —CH₂CH₂CH₂O—), 3.26-3.37(2H, m, —OCONHCH₂CH₂CH₂O—), 3.38(6H, s, CH₃O—), 3.40-4.00(909H, m, CF₃CONHCH₂CH₂CH₂O—, —CH₂CH₂CH₂O—, —(OCH₂CH₂)$_n$—OCH₂—, —(OCH₂CH₂)$_n$—OCH<), 4.08(1H, dd, —CH₂OCONH—), 4.19(1H, dd, —CH₂OCONH—), 5.05(1H, brs, —OCONH—), 5.67(1H, s, >CH—), 7.21-7.59(4H, m, arom. H), 7.31(1H, brs, CF₃CONH—)

GPC analysis; number-average molecular weight (Mn): 9697, weight-average molecular weight (Mw): 9920, polydispersity (Mw/Mn): 1.023.

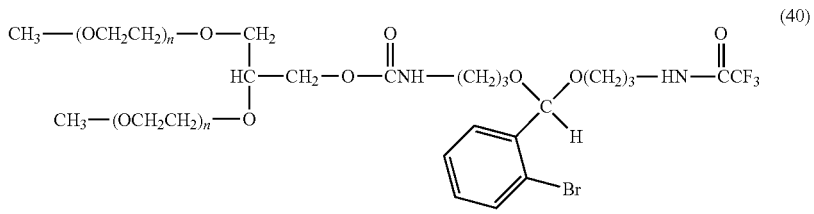

(40)

n = about 113

Example 19

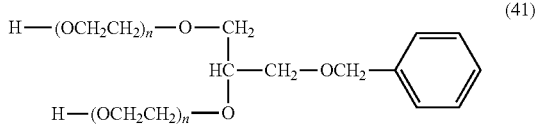

(41)

n = about 113

A compound of the formula (42) was obtained by reacting the compound of the formula (41) synthesized by the method described in JP-A-2004-197077 with acetic anhydride in the presence of triethylamine and 4-dimethylaminopyridine.

$^1$H-NMR (CDCl$_3$, internal standard TMS); δ (ppm): 2.08 (6H, s, CH$_3$CO—), 3.40-4.00(905H, m, —(OCH$_2$CH$_2$)$_n$—OCH$_2$—, —(OCH$_2$CH$_2$)$_n$—OCH<, —CH$_2$OCH$_2$Ph), 4.22 (4H, t, CH$_3$COOCH$_2$—), 4.54(2H, s, —CH$_2$OCH$_2$Ph), 7.27-7.38(5H, m, —CH$_2$OCH$_2$Ph)

(42)

![compound 42 structure]

n = about 113

Example 20

A compound of the formula (43) was obtained by removing the benzyl group from the compound of the formula (42) by the method described in JP-A-2004-197077 and subsequently reacting the resulting compound with N,N'-disuccinimidyl carbonate in the same manner as in Example 5.

$^1$H-NMR (CDCl$_3$, internal standard TMS); δ (ppm): 2.08 (6H, s, CH$_3$CO—), 2.84(4H, s, succinimide), 3.40-4.00 (901H, m, —(OCH$_2$CH$_2$)$_n$—OCH$_2$—, —(OCH$_2$CH$_2$)$_n$—OCH<), 4.22(4H, t, CH$_3$COOCH$_2$—), 4.39(1H, dd, —CH$_2$O—COO-succinimide), 4.49(1H, dd, —CH$_2$O—COO-succinimide)

(43)

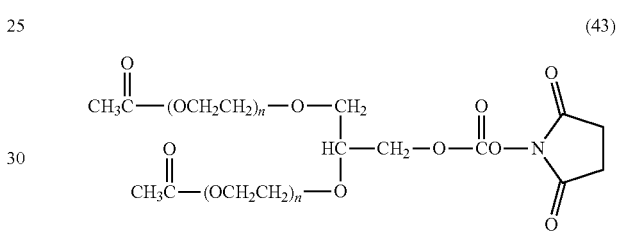

n = about 113

Example 21

A compound of the formula (44) was obtained by reacting the compound of the formula (43) with the compound of the formula (23) in the same manner as in Example 6.

$^1$H-NMR (CDCl$_3$, internal standard TMS); δ (ppm): 1.78-1.93(4H, m, —CH$_2$CH$_2$CH$_2$O—), 2.08(6H, s, CH$_3$CO—), 3.26-3.37(2H, m, —OCONHCH$_2$CH$_2$CH$_2$O—), 3.38(6H, s, CH$_3$O—), 3.40-4.00(907H, m, CF$_3$CONHCH$_2$CH$_2$CH$_2$O—, —CH$_2$CH$_2$CH$_2$O—, —(OCH$_2$CH$_2$)$_n$—OCH$_2$—, —(OCH$_2$CH$_2$)$_n$—OCH<), 4.08(1H, dd, —CH$_2$OCONH—), 4.19(1H, dd, —CH$_2$OCONH—), 4.22 (4H, t, CH$_3$COOCH$_2$—), 5.05 (1H, brs, —OCONH—), 5.67(1H, s, >CH—), 7.21-7.59(4H, m, arom. H), 7.31(1H, brs, CF$_3$CONH—)

(44)

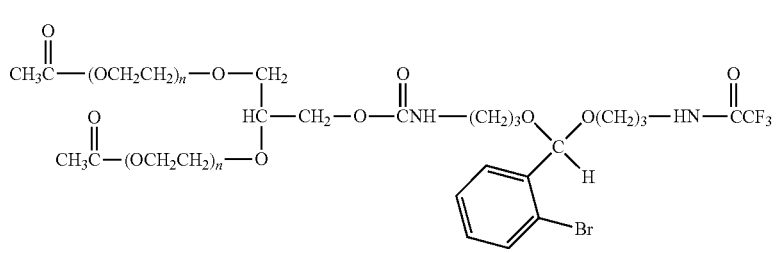

n = about 113

Example 22

A compound of the formula (45) was obtained by removing the acetyl group and the trifluoroacetamide group from the compound of the formula (44) using an aqueous sodium hydroxide solution and subsequently reacting the resulting compound with N-succinimidyl 3-maleimidopropionate in the same manner as in Example 8.

$^1$H-NMR (CDCl$_3$, internal standard TMS); δ (ppm): 1.78-1.83(4H, m, —CONHCH$_2$CH$_2$CH$_2$O—), 2.44(2H, t, —CH$_2$CH$_2$-maleimide), 3.27-3.37(4H, m, —CONHCH$_2$CH$_2$CH$_2$O—), 3.40-4.00(909H, m, —(OCH$_2$CH$_2$)$_n$—OCH$_2$—, —(OCH$_2$CH$_2$)$_n$—OCH<, —CH$_2$CH$_2$CH$_2$O—, —CH$_2$CH$_2$-maleimide), 4.08(1H, dd, —CH$_2$OCONH—), 4.19(1H, dd, —CH$_2$OCONH—), 5.12(1H, brs, —OCONH—), 5.65(1H, s, >CH—), 6.15 (1H, brs, —NHCO—), 6.70(2H, s, maleimide), 7.20-7.60(4H, m, arom. H)

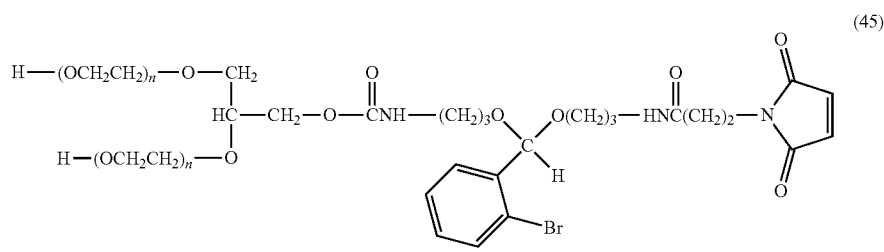

(45)

n = about 113

Example 23

A compound of the formula (46) was obtained by reacting the compound of the formula (45) with N,N'-disuccinimidyl carbonate in the same manner as in Example 14.

$^1$H-NMR (CDCl$_3$, internal standard TMS); δ (ppm): 1.78-1.83(4H, m, —CONHCH$_2$CH$_2$CH$_2$O—), 2.44(2H, t, —CH$_2$CH$_2$-maleimide), 2.84(4H, s, succinimide), 3.27-3.37 (4H, m, —CONHCH$_2$CH$_2$CH$_2$O—), 3.40-4.00(905H, m, —(OCH$_2$CH$_2$)$_n$—OCH$_2$—, —(OCH$_2$CH$_2$)$_n$—OCH<, —CH$_2$CH$_2$CH$_2$O—, —CH$_2$CH$_2$-maleimide), 4.08(1H, dd, —CH$_2$OCONH—), 4.19(1H, dd, —CH$_2$OCONH—), 4.44-4.48(4H, m, —CH$_2$O—COO-succinimide), 5.12(1H, brs, —OCONH—), 5.65(1H, s, >CH—), 6.15(1H, brs, —NHCO—), 6.70(2H, s, maleimide), 7.20-7.60(4H, m, arom. H)

GPC analysis; number-average molecular weight (Mn): 10069, weight-average molecular weight (Mw): 10321, polydispersity (Mw/Mn): 1.025.

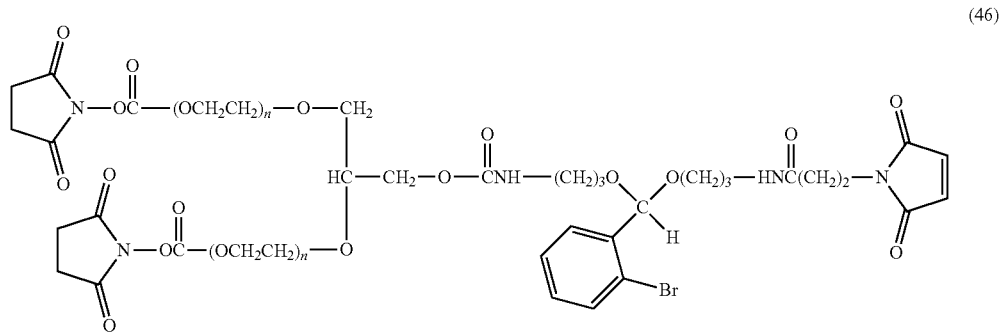

(46)

n = about 113

Example 24

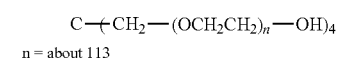

n = about 113

A compound of the formula (48) was obtained by reacting the compound of the formula (47), which had been synthesized by polymerizing ethylene oxide to pentaerythritol, with N,N'-disuccinimidyl carbonate in the same manner as in Example 5.

$^1$H-NMR (CDCl$_3$, internal standard TMS); δ (ppm): 2.84 (16H, s, succinimide), 3.47-3.85(1800H, m, —(OCH$_2$CH$_2$)$_n$—OCH$_2$—), 4.39(4H, dd, —CH$_2$O—COO-succinimide), 4.49(4H, dd, —CH$_2$O—COO-succinimide)

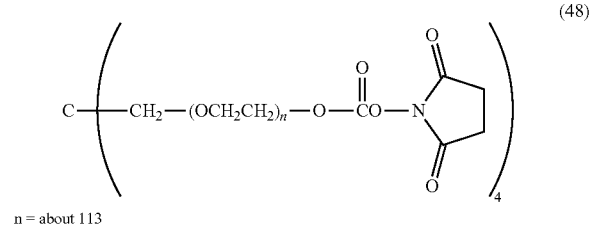

n = about 113

Example 25

A compound of the formula (49) was obtained by reacting the compound of the formula (48) with the compound of the formula (23) in the same manner as in Example 6.

$^1$H-NMR (CDCl$_3$, internal standard TMS); δ (ppm): 1.78-1.93(16H, m, —CH$_2$CH$_2$CH$_2$O—), 3.26-3.37(8H, m, —OCONHCH$_2$CH$_2$CH$_2$O—), 3.47-3.85(1806H, m, CF$_3$CONHCH$_2$CH$_2$CH$_2$O—, —CH$_2$CH$_2$CH$_2$O—, —(OCH$_2$CH$_2$)$_n$—OCH$_2$—), 4.20(8H, t, —OCH$_2$CH$_2$OCONH—), 5.11(4H, brs, —OCONH—), 5.67(4H, s, >CH—), 7.21-7.59(16H, m, arom. H), 7.31(4H, brs, CF$_3$CONH—)

GPC analysis; number-average molecular weight (Mn): 19393, weight-average molecular weight (Mw): 19897, polydispersity (Mw/Mn): 1.026.

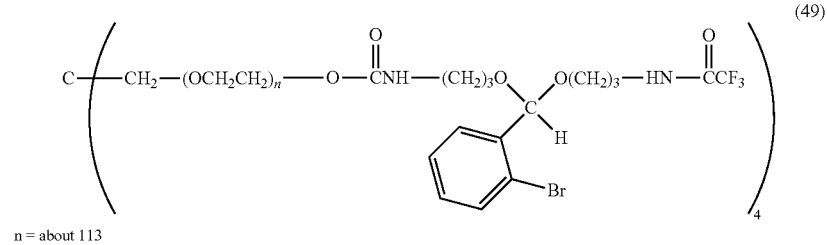

n = about 113

Example 26

Figure 2:
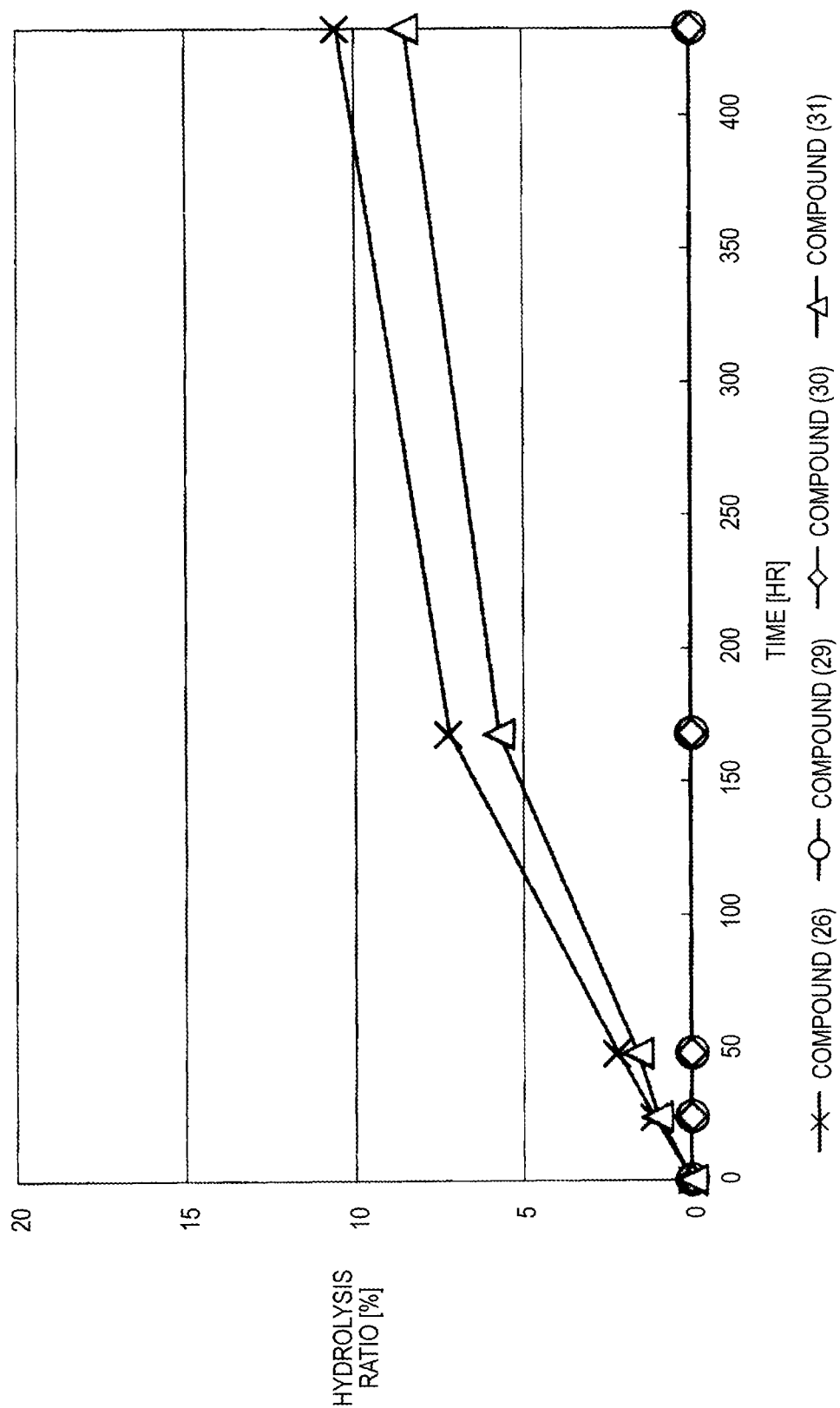
FIG. 2 Results of the hydrolysis test in HEPES deuterated water buffer at pD 7.4 at 37° C. using the compounds of the formula (26), the formula (29), the formula (30), and the formula (31) described in Examples.

Each of the compounds (20 mg) of the formula (26), the formula (29), the formula (30), and the formula (31) were dissolved in MES deuterated water buffer (1 mL) of pD 5.5 and HEPES deuterated water buffer (1 mL) of pD 7.4 and allowed to stand in a thermostatic bath at 37° C. FIG. 1 and FIG. 2 show results of measuring hydrolysis ratios at pD 5.5 and pD 7.4, respectively.

As shown in FIG. 1, half lives ($t_{1/2}$) of the hydrolysis ratios of the compounds of the formula (26), the formula (29), the formula (30), and the formula (31) at pD 5.5 at 37° C. were 24 hours, 2.2 months, 18 days, and 36 hours, respectively. Moreover, at pD 7.4 and 37° C., hydrolysis in a degree of about 10% was observed for 18 days for the compounds of the formula (26) and the formula (31) but no hydrolysis was observed even after 18 days for the compounds of the formula (29) and the formula (30).

While the invention has been described in detail and with reference to specific embodiments thereof, it will be apparent to one skilled in the art that various changes and modifications can be made therein without departing from the spirit and scope thereof.

The invention claimed is:

1. A hydrophilic polymer derivative having a benzylidene acetal linker, which is represented by the following formula (1):

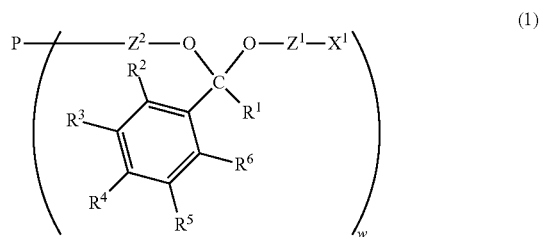

wherein $R^1$ is a hydrogen atom or a hydrocarbon group; $R^2$, $R^3$, $R^4$, $R^5$, and $R^6$ are each independently a hydrogen atom or a substituent and at least one of $R^3$, $R^4$, and $R^5$ is an electron-withdrawing substituent or at least one of $R^2$ and $R^6$ is a substituent, with the proviso that when $R^2$ and $R^6$ are a hydrogen atom, one of $R^3$ to $R^5$ is a substituent selected from the group consisting of a trifluoromethyl group, a cyano group, an acetyl group, a methoxycarbonyl group and a nitro group;

$X^1$ is a chemically reactive functional group selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group;

P is a polyethylene glycol having a hydrocarbon group or a chemically reactive functional group different from $X^1$ at an end;

w is an integer of 1 to 8; and $Z^1$ and $Z^2$ are an independently selected divalent spacer.

2. The hydrophilic polymer derivative according to claim 1, wherein w is 1 and P is represented by the formula (4):

$$\begin{array}{l} Y-(OCH_2CH_2)_n-O-CH_2 \\ (Y-(OCH_2CH_2)_n-O-CH)_v \\ \qquad\qquad\qquad\qquad HC-CH_2- \\ Y-(OCH_2CH_2)_n-O \end{array} \quad (4)$$

wherein Y is a hydrocarbon group having 1 to 24 carbon atoms;

n is an integer of 3 to 1000; and v is 0 or 2.

3. The hydrophilic polymer derivative according to claim 1, wherein w is 1 and P is represented by the formula (5):

$$\begin{array}{l} X^2-Z^3-(OCH_2CH_2)_n-O-CH_2 \\ (X^2-Z^3-(OCH_2CH_2)_n-O-CH)_v \\ \qquad\qquad\qquad\qquad\qquad HC-CH_2- \\ X^2-Z^3-(OCH_2CH_2)_n-O \end{array} \quad (5)$$

wherein $X^2$ is a chemically reactive functional group different from $X^1$;

$Z^3$ is a divalent spacer;

n is an integer of 3 to 1000; and v is 0 or 2.

4. The hydrophilic polymer derivative according to claim 1, wherein w is v+2 and P is represented by the formula (6):

$$\begin{array}{l} \qquad\qquad H_2C-(OCH_2CH_2)_n- \\ \qquad\qquad (HC-(OCH_2CH_2)_n-)_v \\ X^2-Z^3-H_2C-CH \\ \qquad\qquad (OCH_2CH_2)_n- \end{array} \quad (6)$$

wherein $X^2$ is a chemically reactive functional group different from $X^1$;

$Z^3$ is a divalent spacer;

n is an integer of 3 to 1000; and v is 0 or 2.

5. The hydrophilic polymer derivative according to claim 1, wherein P is a polyethylene glycol having an end number of 2 to 8, all the ends of the polyethylene glycol constituting P are each bound to $Z^2$, and w is equal to the end number of the polyethylene glycol.

6. The hydrophilic polymer derivative according to claim 5, wherein P is selected from the group consisting of the formula (r), the formula (s), the formula (t), the formula (u), and the formula (v):

$$-CH_2CH_2(OCH_2CH_2)_n- \quad (r)$$

$$\begin{array}{l} H_2C-(OCH_2CH_2)_n- \\ HC-(OCH_2CH_2)_n- \\ H_2C-(OCH_2CH_2)_n- \end{array} \quad (s)$$

$$\begin{array}{l} \qquad (OCH_2CH_2)_n- \\ H_2C\quad CH_2-(OCH_2CH_2)_n- \\ \qquad\diagdown C \diagup \\ H_2C\quad CH_2-(OCH_2CH_2)_n- \\ \qquad (OCH_2CH_2)_n- \end{array} \quad (t)$$

$$\begin{array}{l} H_2C-(OCH_2CH_2)_n- \\ HC-(OCH_2CH_2)_n- \\ H_2C \\ | \\ O \\ | \\ H_2C \\ | \\ HC-(OCH_2CH_2)_n- \\ H_2C-(OCH_2CH_2)_n- \end{array} \quad (u)$$

$$\begin{array}{l} H_2C-(OCH_2CH_2)_n- \\ HC-(OCH_2CH_2)_n- \\ H_2C \\ \left(\begin{array}{l} O \\ | \\ H_2C \\ | \\ HC-(OCH_2CH_2)_n- \\ H_2C \\ \end{array}\right)_4 \\ O \\ | \\ H_2C \\ | \\ HC-(OCH_2CH_2)_n- \\ H_2C-(OCH_2CH_2)_n- \end{array} \quad (v)$$

wherein the variable w in structure (r) is 2, the variable w in structure (s) is 3, the variable w in structures (t) and (u) is 4, and the variable w in structure (v) is 8, and n is an integer of 3 to 2000.

7. The hydrophilic polymer derivative according to claim 3, wherein $X^2$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, α-haloacetyl group, an alkynyl group, an allyl group, a vinyl group, an amino group, an oxyamino group, a hydrazide group, and an azide group.

8. The hydrophilic polymer derivative according to claim 4, wherein $X^2$ is selected from the group consisting of an active ester group, an active carbonate group, an aldehyde group, an isocyanate group, an isothiocyanate group, an epoxy group, a maleimide group, a vinyl sulfone group, an acryl group, a sulfonyloxy group, a carboxy group, a thiol group, a dithiopyridyl group, an α-haloacetyl group, an alkynyl group, an allyl group, a vinyl group, an amino group, an oxyamino group, a hydrazide group, and an azide group.

9. The hydrophilic polymer derivative according to claim 3, wherein $X^2$ is selected from the group consisting of the formula (a), the formula (b), the formula (c), the formula (d), the formula (e), the formula (f), the formula (g), the formula (h), the formula (i), the formula (j), the formula (k), the formula (l), the formula (m), and the formula (n):

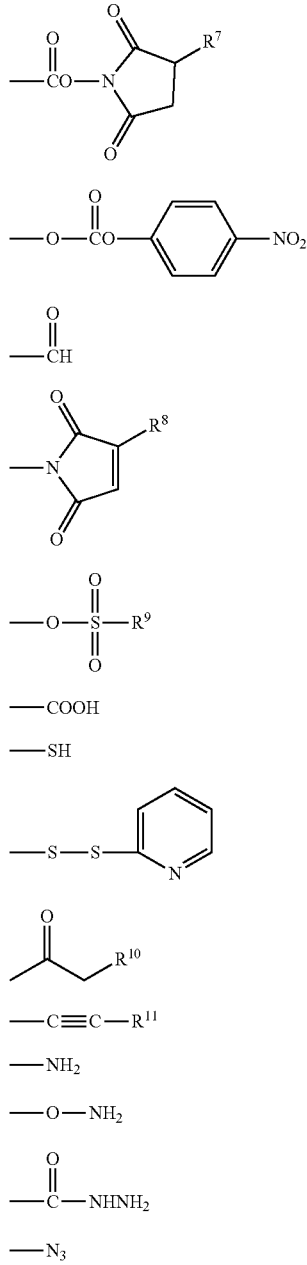

wherein $R^7$ is a hydrogen atom or a sulfo group;
$R^8$ and $R^{11}$ are independently a hydrogen atom or a hydrocarbon group having 1 to 5 carbon atoms;
$R^9$ is a hydrocarbon group having 1 to 10 carbon atoms, which may contain a halogen atom; and
$R^{10}$ is a halogen atom selected from a chlorine atom, a bromine atom, and an iodine atom.

10. The hydrophilic polymer derivative according to claim 4, wherein $X^2$ is selected from the group consisting of the formula (a), the formula (b), the formula (c), the formula (d), the formula (e), the formula (f), the formula (g), the formula (h), the formula (i), the formula (j), the formula (k), the formula (l), the formula (m), and the formula (n):

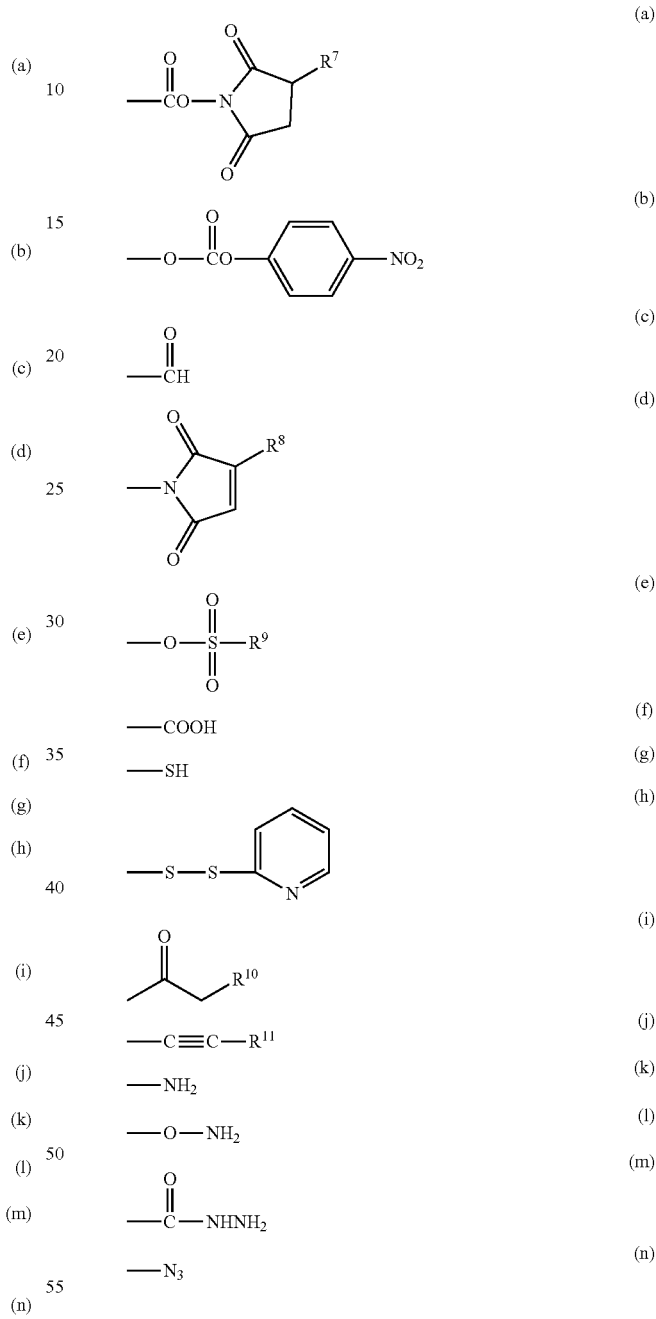

wherein $R^7$ is a hydrogen atom or a sulfo group;
$R^8$ and $R^{11}$ are independently a hydrogen atom or a hydrocarbon group having 1 to 5 carbon atoms;
$R^9$ is a hydrocarbon group having 1 to 10 carbon atoms, which may contain a halogen atom; and
$R^{10}$ is a halogen atom selected from a chlorine atom, a bromine atom, and an iodine atom.

11. The hydrophilic polymer derivative according to claim 3, wherein $Z^3$ is a saturated hydrocarbon group which may have a bond selected from an ether bond, an ester bond, a carbonate bond, a urethane bond, an amide bond, and a secondary amino group.

12. The hydrophilic polymer derivative according to claim 4, wherein $Z^3$ is a saturated hydrocarbon group which may have a bond selected from an ether bond, an ester bond, a carbonate bond, a urethane bond, an amide bond, and a secondary amino group.

* * * * *